(12) United States Patent
Hiraguchi et al.

(10) Patent No.: US 6,956,717 B2
(45) Date of Patent: Oct. 18, 2005

(54) RECORDING MEDIA CARTRIDGE

(75) Inventors: Kazuo Hiraguchi, Kanagawa (JP); Wataru Iino, Kanagawa (JP); Shozo Onmori, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 392 days.

(21) Appl. No.: 10/123,119

(22) Filed: Apr. 17, 2002

(65) Prior Publication Data

US 2002/0149879 A1    Oct. 17, 2002

(30) Foreign Application Priority Data

| Apr. 17, 2001 | (JP) | ............................ 2001-117831 |
| Apr. 17, 2001 | (JP) | ............................ 2001-117832 |
| May 18, 2001 | (JP) | ............................ 2001-149714 |
| Jul. 13, 2001 | (JP) | ............................ 2001-213517 |
| Sep. 28, 2001 | (JP) | ............................ 2001-304522 |

(51) Int. Cl.[7] ......................................... G11B 23/02

(52) U.S. Cl. ..................................................... 360/132

(58) Field of Search ................................ 360/132, 347, 360/347.1–347.2; 242/347, 347.1, 347.2

(56) References Cited

U.S. PATENT DOCUMENTS

| 4,323,207 | A | * | 4/1982 | Gebeke | .................... 242/347.1 |
| 4,633,355 | A | * | 12/1986 | Harada | ..................... 242/338.2 |
| 4,663,688 | A | * | 5/1987 | Sasaki et al. | ................ 360/132 |
| 5,084,799 | A | * | 1/1992 | Moo Yeol et al. | ........ 242/347.1 |
| 5,417,380 | A | * | 5/1995 | Gelardi et al. | ............ 242/347.1 |
| 5,544,834 | A | * | 8/1996 | Esguerra et al. | .......... 242/347.1 |
| 5,596,464 | A | * | 1/1997 | Sawada | ....................... 360/132 |

* cited by examiner

*Primary Examiner*—Angel Castro
(74) *Attorney, Agent, or Firm*—Sughrue Mion, PLLC

(57) ABSTRACT

The recording media cartridge includes a lid which is mounted on an upper half with rotary shafts provided at both side ends thereof in a manner capable of opening/closing for a front surface opening portion on a case body formed by coupling the upper half and a lower half, and a lid urging member having an inflection arm portion between a support end portion for engaging the member to the upper half and an anchor end portion anchored on a front edge inner surface, wherein the inflection arm portion of the lid urging member is brought into contact with the upper half at least at one portion during the open state and is deformed through inflection at the inflection arm portion by making the contact portion as a point of inflection, and the lid is urged in a rotating direction for closing.

6 Claims, 16 Drawing Sheets

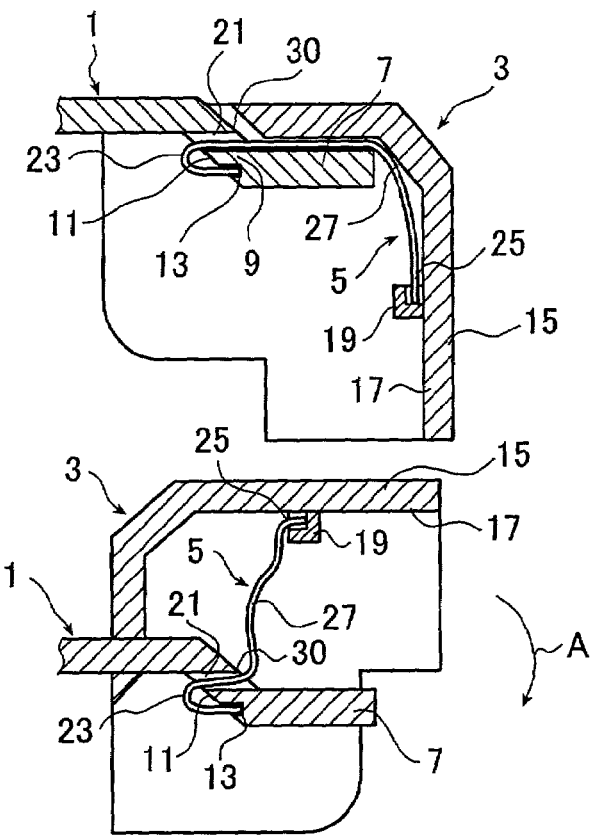
FIG.1A
FIG.1B
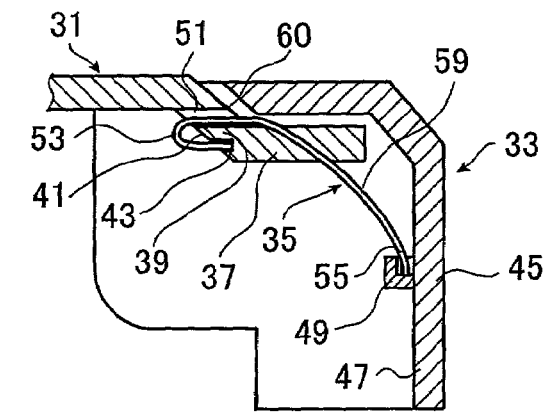
FIG.2A
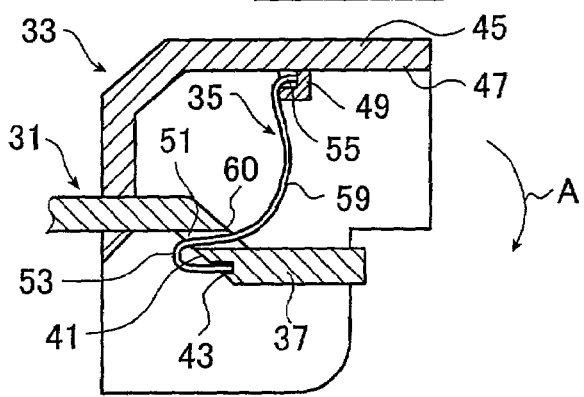
FIG.2B

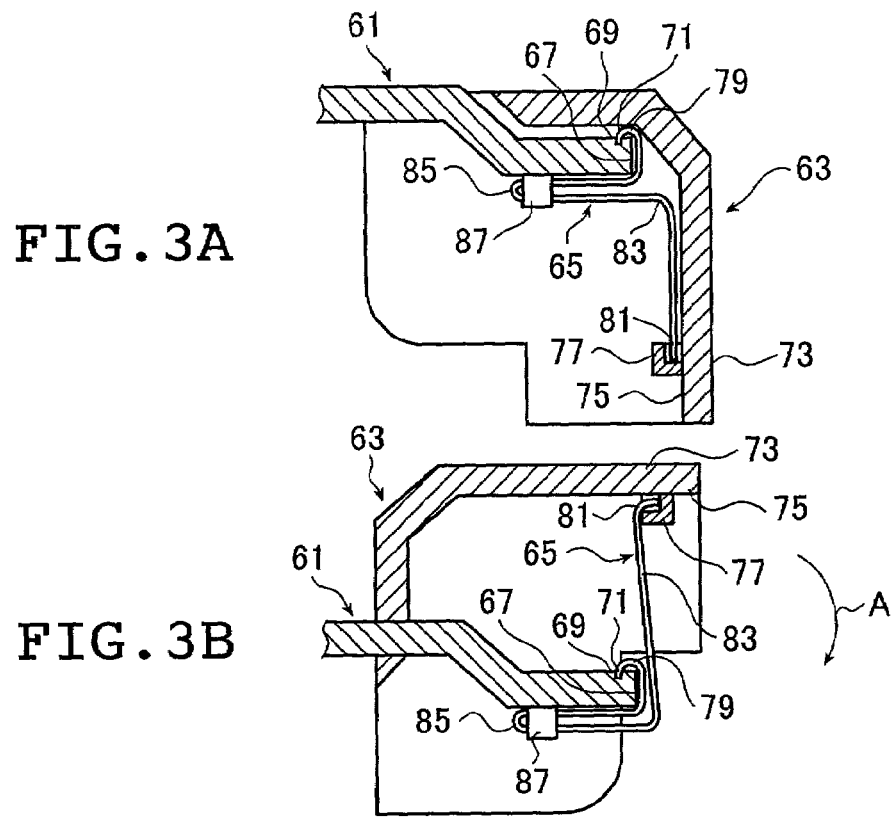
FIG. 3A
FIG. 3B
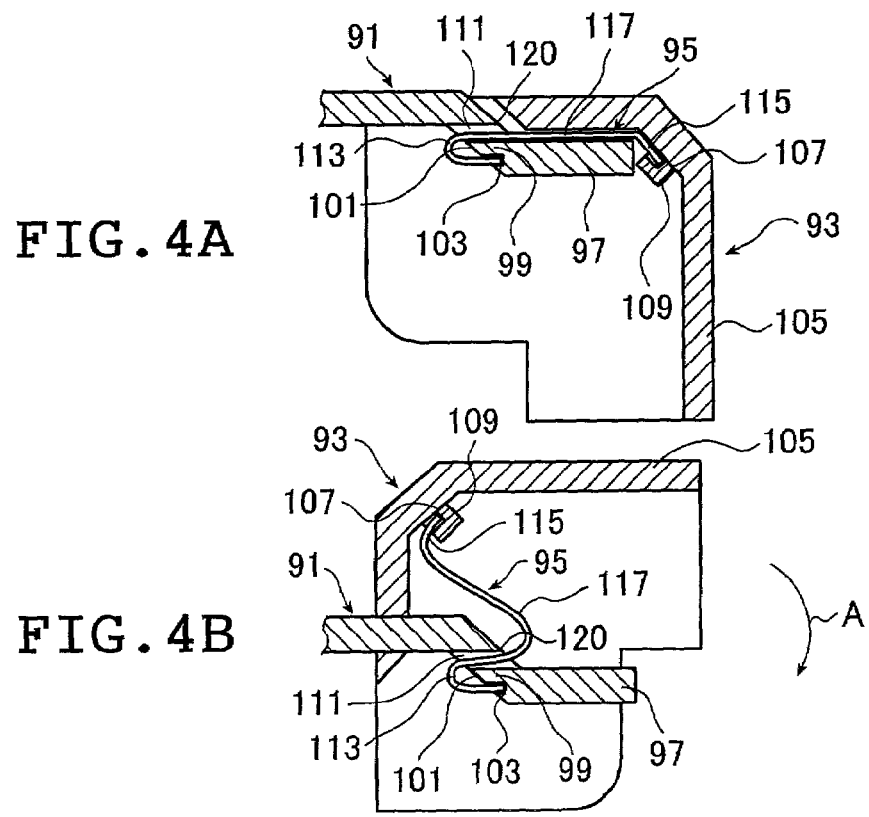
FIG. 4A
FIG. 4B

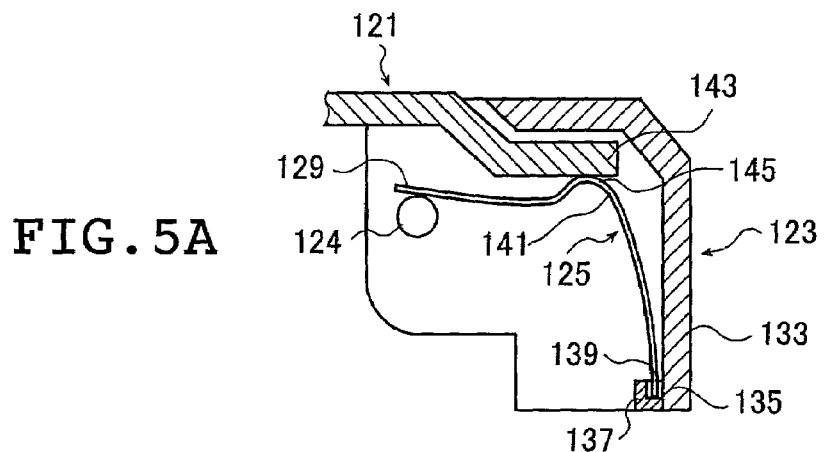
FIG. 5A
FIG. 5B
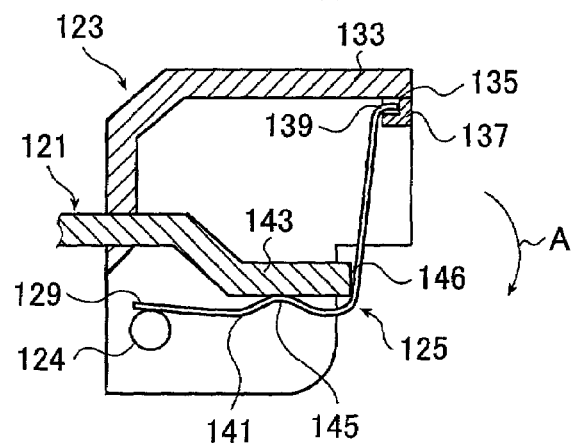
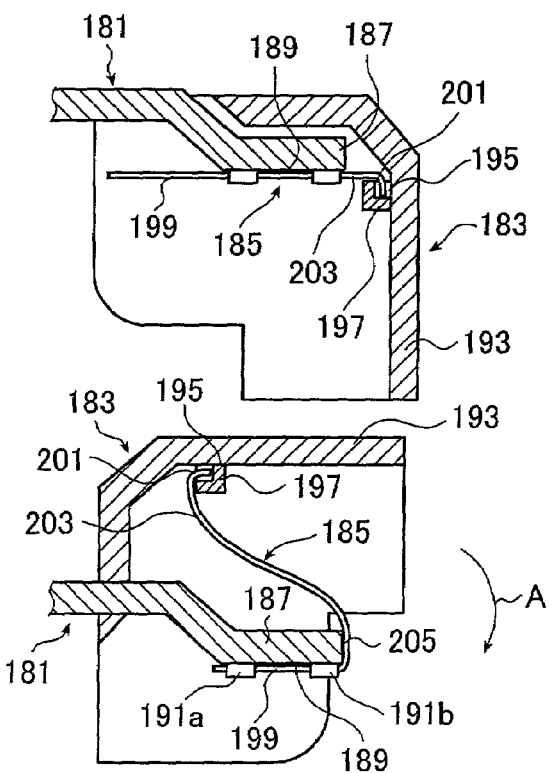
FIG. 6A
FIG. 6B

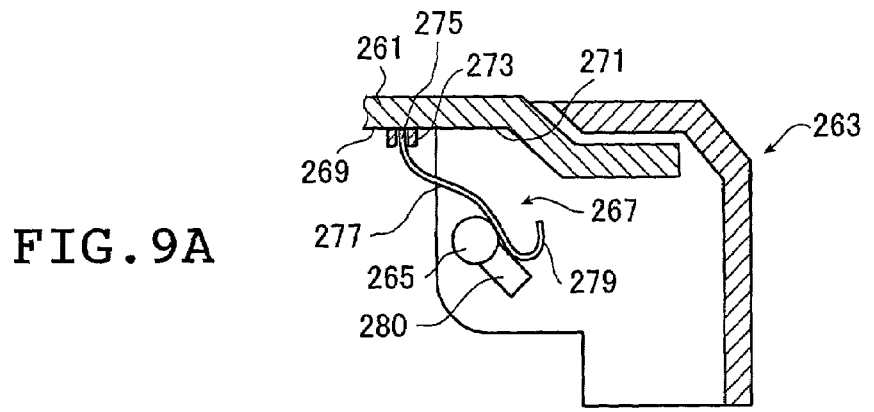
FIG.9A
FIG.9B
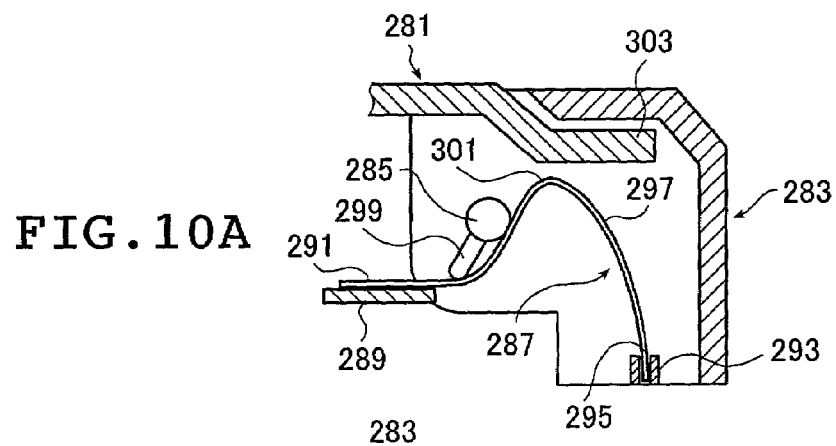
FIG.10A
FIG.10B

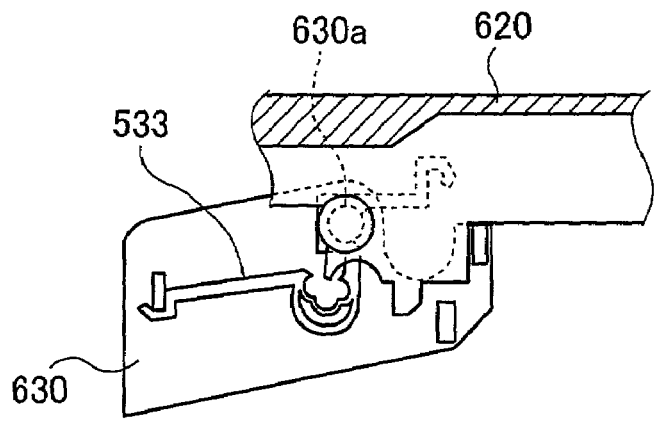
FIG.15A
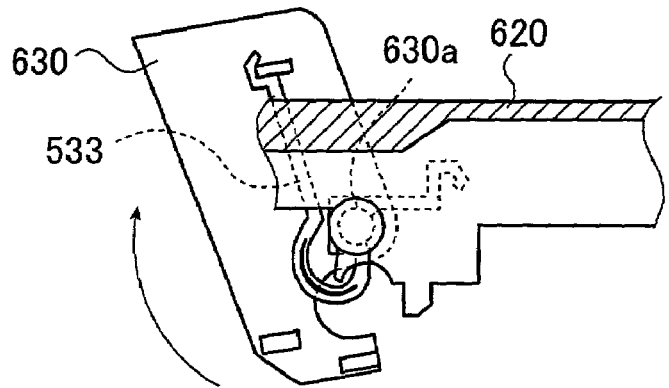
FIG.15B
FIG.17A
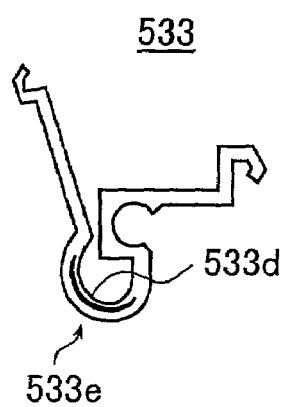
FIG.17B
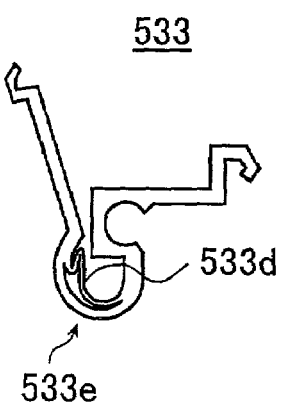

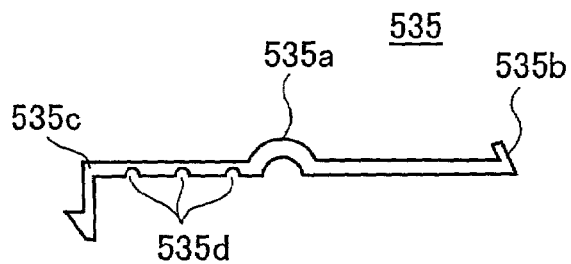
FIG.24A
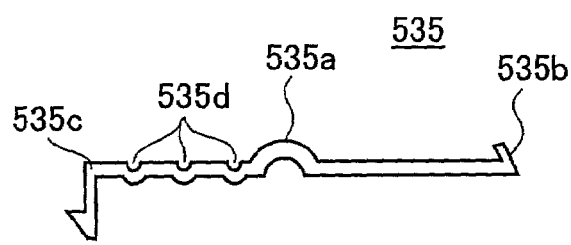
FIG.24B
FIG.25
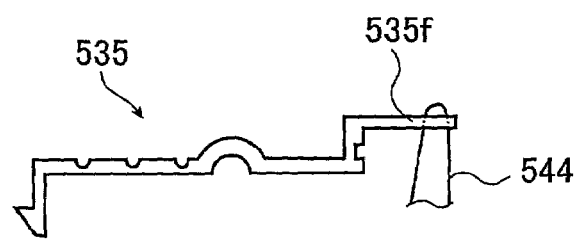

RECORDING MEDIA CARTRIDGE

BACKGROUND OF THE INVENTION

1. Field of the Invention

The present invention relates to a recording media cartridge such as a magnetic tape cassette. More specifically, the present invention relates to a recording media cartridge, e.g. a magnetic tape cassette, wherein a lid urging or biasing member such as a lid spring can be made of resin and the recording media cartridge with a lid spring made of resin as the lid urging member allows the omission of the sorting labor upon disposal of the cartridge as well as the reduction in the assembling steps of the cartridge, and moreover the decrease in the environmental impact; and a recording media cartridge, e.g. a magnetic tape cassette such as a digital video cassette (DVC) made effective in reducing the environmental impact.

2. Description of the Related Art

As a recording/reproducing tape cassette or cartridge used in a video tape recorder or video camera for business use or of consumer-oriented, or again, as a large capacity recording medium for data back-up in an external storage device such as a computer, is usually known a magnetic tape cassette or cartridge (hereinafter represented by "magnetic tape cassette") which has a pair of reels around which a magnetic recording tape as recording media is wound (in the case of so-called two-reel type) or a single reel on which a magnetic tape is wound (in the case of so-called one-reel type) rotatably contained in a case body (casing or cassette case) composed of an upper half and a lower half. Examples thereof include a magnetic tape cassette whose structure and dimension are standardized in JIS X6127, X6129, X6130, X6171 or X6172, or ECMA-288. A magnetic or magneto-optical disk cartridge using a magnetic or magneto optical disk as recording media is also well known as a large capacity recording medium.

Such a recording media cartridge as a magnetic or magneto-optical disk cartridge and a magnetic tape cartridge or magnetic tape cassette referred to above is used for data storage in a computer etc. to retain important information recorded therein, so that it is produced with various protection mechanisms added thereto for preventing a damage of a magnetic or magneto-optical disk, or a jamming of a magnetic tape or inadvertent draw-out thereof.

For example, in a conventional magnetic tape cassette, a magnetic tape taken up or rewound between a pair of tape reels is extended across an opening portion provided in the front surface of a case body and travels through this portion to be brought into contact with a magnetic data reading/recording device of a recording/reproducing apparatus in order that magnetic data is read or recorded. In order to protect the magnetic tape at this portion and to enhance dust-proof property of the opening portion, a front lid is mounted in a manner capable of opening/closing for this front surface opening portion.

This will now be described specifically with respect to a two-reel type magnetic tape cassette.

FIG. 26 is a partially exploded perspective view showing a structure of a conventional general magnetic tape cassette. As shown in FIG. 26, a case body of a magnetic tape cassette 400 is composed of an upper half 402 and a lower half 404 coupled in a capped manner, and, between these two halves, a magnetic tape 408 wound between a feed side reel 406a and a take-up side reel 406b is received.

A lid (front lid) 410 for covering and protecting the magnetic tape 408 during non-use of this magnetic tape cassette 400 is mounted rotatably around a pin (not shown) in the front surface of the upper half 402. Also, a lock mechanism (lid lock mechanism) composed of a lid lock member 424 (see FIG. 28) and the like is provided on the lower half 404 in order to lock the lid 410 so as not to open during non-use of this magnetic tape cassette 400.

Incidentally, the above-described lid lock mechanism is normally provided corresponding to only one end of the lid 410. FIG. 27 is a perspective view of the one end portion of the lid 410 (the end portion on the side on which the lid lock mechanism is provided as described later). As shown in FIG. 27, a rotary shaft 414 is provided inside a side surface of the lid 410, and then the lid 410 is fitted on the upper half 402 to be rotatable as indicated by an arrow A around this rotary shaft 414.

Also, a projection 416 serving as a reel release key is provided to the rotary shaft 414. Furthermore, a hole (lid lock hole) 418 for receiving a constituent member (lid lock key 428) of the lid lock mechanism is provided in the side surface of the lid 410 in order not to accidentally open the lid 410 during non-use of the magnetic tape cassette.

FIG. 28 is an enlarged perspective view showing a vicinity of a reel lock member 412b. As shown in FIG. 28, the reel lock member 412b is provided with a pin 420, which is fitted into the center of the member 412b, supported rotatably around the pin 420, formed at one end with a wall-like member 413a, and formed at the other end with a pawl-like member (braking pawl) 413b. The braking pawl 413b is engaged with an engagement tooth 407 provided on a circumferential edge of a reel flange 406b to thereby limit the rotation of the reel 406b, thus preventing loosening of the magnetic tape.

Incidentally, normally, the reel lock member 412b is urged or biased in a direction in which the braking pawl 413b is engaged with the engagement tooth 407 by a coil spring 422.

Also, a lid lock member 424 is arranged in the vicinity of the reel lock member 412b. This lid lock member 424 is provided with a pin 426, which is fitted into one end portion 424a of the member 424, and engaged therewith as shown in FIG. 28. The lid lock member 424 is rotatable around this pin 426 and a lid lock key 428 in a projecting shape is provided at the other end portion 424b.

As shown in FIG. 26, the lid lock key 428 projects to the outside from a hole 404a formed in the side wall of the lower half 404 and engaged with the lid lock hole 418 provided in the side wall of the lid 410 shown in FIG. 26 or 27 so as to limit (lock) the lid 410 for preventing it from rotating.

As shown in FIG. 28, normally (in non-use of the magnetic tape cassette), the lid lock member 424 is urged by an end portion of the coil spring 422 for urging the above-described reel lock member 412b so that the lid lock key 428 is engaged with the lid lock hole 418 of the lid 410 to thereby limit the lid 410 so as not to rotate.

When the magnetic tape cassette 400 is loaded in the recording/reproducing apparatus, a member on the recording/reproducing apparatus side pushes a lower portion of the end portion 424b of the lid lock member 424 in a direction indicated by an arrow B in FIG. 28, whereby the end portion 424b of the lid lock member 424 is rotated in a direction indicated by an arrow C in FIG. 28. With this, the lid lock key 428 is released from the engagement with the lid lock hole 418 of the lid 410, whereby the lid 410 can be rotated in a direction indicated by an arrow A in FIG. 29.

As described above, when the lid 410 is rotated in the direction indicated by the arrow A in FIG. 29, the rotary shaft 414 is also rotated in the direction indicated by the arrow A as shown in FIG. 29. With this, the reel release key 416 provided on the rotary shaft 414 urges the wall-like member 413a of the reel lock member 412b in a direction indicated by an arrow D. As a result, the reel lock member 412b is rotated around the pin 420, and the braking pawl 413b provided at one end thereof is moved in a direction indicated by an arrow E in FIG. 28 to thereby release the engagement with the engagement tooth 407 of the reel 406b. In this manner, the reel 406b becomes rotatable.

FIG. 30 is a perspective view showing a mounted state of the lid spring for urging the lid 410 in a closing direction. In FIG. 30, reference character 430 denotes a lid spring, reference character 430a denotes a U-shaped engagement portion provided at one end thereof for engaging with the projection 416 on the rotary shaft 414 of the lid 410, and reference character 430b denotes an engagement portion at the other end of the lid spring for engaging with an engagement recess portion 402a of the upper half 402. When the lid 410 is opened in a way indicated by an arrow F, the lid spring 430 having such a configuration as above works inversely, that is to say, so as to close the lid 410.

FIGS. 31A and 31B are perspective views each showing the inner surfaces of an upper half of a conventional magnetic tape cassette and a lid fitted on the upper half, FIG. 31A illustrating the case where the lid is closed and FIG. 31B the case where the lid is opened.

As seen from the figures, a lid 460 is fitted on a front edge 453 of an upper half 452. The lid 460 has rotary shafts (hereinafter referred to simply as shafts) 464 projected from side surfaces 457 on both its sides toward the inside of the upper half 452, which shafts 464 are rotatably supported on shaft supports 461 provided at front ends 459 of side walls of the upper half 452, respectively.

On a shaft end 465 of the shaft 464 is mounted a lid spring 480 which is a torsion coil spring. In the lid spring 480, a coil portion 480c is fitted onto the shaft end 465, a U-shaped (semicircular) engagement portion 480a at one end of the spring 480 is engaged with a projection (engagement rib) 466 projected from the circumferential surface of the shaft 464, and an engagement portion (elastic arm portion) 480b at the other end is anchored to an engagement recess (anchor groove) 452a formed in a front part of the inner surface of the upper half 452. The lid spring 480 serves as a lid urging member which urges the lid 460 against the upper half 452 in the closing direction.

When the lid 460 is in a closed state as shown in FIG. 31A, an opening/closing mechanism for the lid 460 is locked by a lid lock mechanism composed of a lid lock member 474 (see FIG. 28) which is provided in the part of a lower half 454 directly below the side surface 457 of the upper half 452.

The lid 460 in a closed state as above can be opened by pushing in a lid release member (not shown) whose top portion is protruded from a lid lock hole 468 bored in the side surface 457 to cancel the lock by the lid lock member 474 (see FIG. 28) provided on the lower half 454 and then rotating the lid 460 about the common axis of the shafts 464 to tip up it as shown in FIG. 31B. In this way, a front opening of a case body of the magnetic tape cassette is made open, as the lid 460 being urged in a rotating direction for closing by the lid spring 480.

Next, a general structure of a digital video cassette (DVC) as a magnetic tape cassette using a different type of lid will be described.

FIG. 32 is an exploded perspective view showing a structure of the above-described DVC that is one example of a magnetic tape cassette. As shown in FIG. 32, a case body 610 of this magnetic tape cassette is constituted by coupling in a capped manner an upper half 620 and a lower half 622, each of which has a bottom plate and a circumferential wall. A magnetic tape 626 wound around tape reels 624 on a pay-out side and a take-up side is received between these two halves.

The tape reels 624 are restricted in slippage in the direction parallel to the plane of the bottom plate 622a of the lower half 622 by a plurality of restriction ribs provided upright on the bottom plate 622a in such a manner that they extend along the circumferences of the respective tape reels. Also, an opening is provided in a bottom plate of the upper half 620 so that the amount of wound magnetic tape 626 in the tape reels 624 may be confirmed, and a transparent window (see-through window) 620a is provided for closing this opening.

Also, a pair of reel urging plate leaf springs (hereinafter referred to as reel pressing springs) 638 are provided on the inner surface (the lower surface in the drawing) of the upper half 620 correspondingly to the respective tape reels 624. The respective reel pressing springs 638 are fixed to the inner surface of the upper half 620 by ultrasonic welding, hot welding, or the like to urge the corresponding tape reels 624 toward the lower half 622 side.

A lid (front lid) for covering and protecting the magnetic tape 626 in non-use of this magnetic tape cassette is mounted on the front surface (on the left side in the drawing) of the upper half 620. As will be described later, this lid is composed of three members, i.e., an outer lid 630, an upper lid 632 and an inner lid 634, which are mounted to make it possible to open an opening portion 628 of the magnetic tape cassette, respectively.

On extensions 640 located on both sides of the opening portion 628 provided on the front end side (on the left side in the drawing) of the lower half 622 are provided tape guides 646. Each tape guide 646 leads the magnetic tape 626 paid out by one tape reel 624 and taken up by the other tape reel 624 to cause it to pass through a predetermined position in the opening portion 628.

On the rear end side (on the right side in the drawing) of the lower half 622 is incorporated a tape reel lock member 636 having tape reel anchoring arms 636a and a slider body 636b. The slider body 636b is slidably held between a pair of guide ribs provided upright on the bottom plate 622a of the lower half 622. The tape reel lock g member 636 is urged by a helical compression spring 642 so as to cause the tape reel anchoring arms 636a to engage with engagement teeth 624a formed in the circumferences of lower flanges of the tape reels 624, respectively, to thereby prevent an inadvertent rotation of respective tape reels 624. Thus, the loosening of the magnetic tape 626 wound, etc. is prevented.

Among the outer lid 630, the upper lid 632 and the inner lid 634 each mounted on the upper half 620 as referred to above, the outer lid 630 has a flat portion and a side plate and from the inside of the side plate is protruded a lock pin 630a. On a side wall portion 622c as a part of the circumferential wall of the lower half 622, a lid lock member 644 is rotatably mounted, to which the lock pin 630a of the outer lid 630 is anchored when the outer lid 630 is in a closed state. The lid lock member 644 is urged in the direction for anchoring the lock pin 630a by a lid lock spring (not shown) also provided on the lower half 622.

Further, a safety plug 652 for preventing data recorded on the magnetic tape 626 from an erroneous deletion is mounted on the lower half 622. The safety plug 652 has a pawl protruding from its one side surface (on the right side in the drawing) and is so formed that the pawl projects from an opening provided in the circumferential wall of the upper half 620 to the outside, as the plug 652 being fitted in the lower half 622.

The safety plug 652 can be moved along a guide rib provided upright on the bottom plate 622*a* of the lower half 622 by manipulating the pawl from the outside. As a result, the safety plug 652 makes it possible with its bottom surface to close or open a detection hole provided in the bottom plate of the lower half 622. A recording device and the like read the state, namely a closed state or an open state, of the detection hole to determine whether new data can be written in the magnetic tape 626 or not.

The lower half 622 has a rectangular bottom plate 622*a*. The bottom plate 622*a* supports a pair of tape reels 624, around which the magnetic tape 626 is wound, in a rotatable manner. In addition, the bottom plate 622*a* has reel shaft insertion holes 622*b* for, when the magnetic tape cassette is loaded in a recording/reproducing apparatus, allowing reel shafts (not shown) to be inserted from the recording/reproducing apparatus into the tape reels 624 and rotating to drive the tape reels 624.

The bottom plate 622*a* further has the extensions 640 which extend from the right and left ends of the plate 622*a* forward. In the extensions 640 at both the right and left ends, the tape guides 646 in a cylindrical form are provided upright on the bottom plate 622*a* and perpendicularly thereto for leading the magnetic tape 626 extended between the tape reels 624 through a predetermined route to the front surface of the case body. The bottom plate 622*a* of the lower half 622 is partially cut out between the extensions 640 and the space thus made constitutes the opening portion 628 of the case body.

The upper and lower halves 620 and 622, the outer lid 630, the upper lid 632, the inner lid 634, upper and lower flanges of the tape reels 624, and so forth are each formed by injection molding. In a magnetic tape cassette, many other components formed by injection molding are used appropriately.

Considering the magnetic tape cassette having the thus described structure, a lid spring (torsion spring) 631 for urging the three members of the above-described outer lid 630, upper lid 632 and inner lid 634 in a direction for closing the opening portion 628 of the magnetic tape cassette is conventionally made of metal, fitted into the rotary shaft 630*a* of the above-described outer lid 630, and set as anchored to the upper half 620 and the outer lid 630.

As shown in FIGS. 33A and 33B, urging of the above described lid is performed by the lid spring 631, and this lid spring 631 is set as fitted between the upper half 620 and the outer lid 630 as described above. Here, FIGS. 33A and 33B are partially cross-sectional, enlarged side views showing a mounting state of a lid using a conventional lid spring made of metal, where FIG. 33A shows a closed state and FIG. 33B shows a flat state of the lid.

Incidentally, in recent years, as concern about the environmental issue is increased and an attention is paid to the adverse influence on the environment due to various kinds of wastes such as plastics and composite materials, it is becoming important to reduce the wastes or to use materials which do not cause the contamination of the atmosphere, water and soil and do not place the hindrance to the environmental preservation even when disposed of, i.e., to reduce the impact to the environment. For this reason, it is required also for the industrial products to take a configuration that may be incorporated into a recycling system.

Here, considering a recording media cartridge such as a magnetic tape cassette of various types constructed as described above, its major part including the case body is made of plastics and a metal material is used only in a part that needs relatively high strength or a part that needs elasticity. More specifically, in the magnetic tape cassette as such, each urging spring of the reel lock mechanism and the lid lock mechanism and further a lid spring are made of metal in view of durability.

However, when the thus constructed magnetic tape cassette is disposed of after use, it is necessary to disassemble the magnetic tape cassette and to pick up the metal-made springs and such a work needs manual labor. It is desired that such labor be removed as much as possible.

Especially in a conventional magnetic tape cassette such as, for example, shown in FIGS. 31A and 31B, the lid spring has the complicated shape as described above and requires such an arrangement that the coil portion 480*c* is fitted onto the shaft end 465 of the shaft 464, the engagement portion 480*a* is engaged with the projection 466, and the engagement portion 480*b* is anchored to the engagement recess (groove) 452*a*. Accordingly, the assembling work thereof is difficult, which is a cause of the prevention of improving the assembling property of the magnetic tape cassette.

In addition, the lid spring is hard to form with a resin material because of its configuration as a torsion coil spring and can not but be formed with a metal. The removal of the lid spring from the rotary shaft 464 is troublesome, making the disassembling of the magnetic tape cassette and the sorting of materials difficult. Thus, the sorting and collection of resin materials become difficult, a disadvantageous result to the reduction in the environmental impact.

If the magnetic tape cassette shown in FIG. 32 has such a structure as shown in FIGS. 33A and 33B, it is assembled in such a manner that the upper lid 632 and the inner lid 634 are mounted on the outer lid 630, then onto the rotary shaft 630*a* of the outer lid 630 is fitted the lid spring 631 made of metal, the whole assembly thus obtained is fitted into a rotary shaft engaging portion 620*b*, which is provided upright on the upper half 620, from the outside (on the front surface side), and finally one end of the spring 631 is anchored to the anchor portion in a clamped fashion. Such a procedure requires much labor since many components and members are to be handled at once.

On the other hand, the conventional lid spring 631 made of metal, which is used in the conventional magnetic tape cassette as described above, is not easy to remove when it is to be sorted and collected. In other words, the lid spring 631 can be removed only by disassembling at least the lid portion of the magnetic tape cassette. As a consequence, a problem arises that the sorting and collection of materials might not always be performed perfectly.

SUMMARY OF THE INVENTION

The present invention has been made in view of the above-described situation, and a first object of the invention is to provide a recording media cartridge, e.g. a magnetic tape cassette, having a lid urging member which is easy to incorporate into a case body and is thus effective in improving the assembling property of the recording media cartridge, e.g. a magnetic tape cassette and which can be made with a resin material without employing a spring member made of metal. The lid urging member made with a resin material allows the sorting and collection of resin materials to be easier so that the recording media cartridge is effective for the reduction in environmental impact.

A second object of the present invention is to provide a recording media cartridge, e.g. a magnetic tape cassette, wherein the sorting labor upon disassembling and disposing thereof is saved while the number of steps during assembling is reduced and the reduction in environmental impact is promoted by using a spring made of resin (plastic) instead of a metallic part conventionally used as a lid urging member (lid spring) to improve the shape of the lid urging member.

A third object of the present invention is to solve the above-mentioned problems in the prior art and provide a recording media cartridge, e.g. a magnetic tape cassette, with a reduced environmental impact, wherein a lid urging member (lid spring) for urging a lid, which is rotatably fitted on an upper half of the cartridge and protects a recording media such as a magnetic tape, in a closing direction is made of resin and anchored in a novel fashion, yet the recording media cartridge, e.g. a magnetic tape cassette, can be assembled and disassembled as efficiently as or more efficiently than conventional and, in addition, its basic functions are not adversely affected by such a change in material and anchoring fashion of the lid urging member such as the lid spring.

In order to achieve the various objects as referred to above, the present inventors have investigated in various ways on the decrease in such wastes as above, namely the reduction in environmental impact, in a recording media cartridge, e.g. a magnetic tape cassette, of varied configuration as stated above. They have finally found the configurations for the case body of such a recording media cartridge, e.g. a magnetic tape cassette, as above that are effective for the sorting of different materials and can realize an easier disassembly. Specifically, various configurations in which the above lid spring is made of resin to thereby facilitate the sorting and collection have been found and the present invention was made based on such findings.

Moreover, the present invention was made by the inventors taking it into account that the novel lid spring made of resin and its anchoring system can preferably realize the assembling and disassembling of the cartridge of the invention as efficiently as or more efficiently than such a lid spring as conventional one made of metal and anchored to a shaft of the lid, that, at the same time, the lid spring made of resin is required to have the strength and the shape stability (property of generating no torsion or curving) equal to or higher than the lid spring made of metal, and that the change in material, shape and configuration of the lid spring as above is required not to affect adversely to the basic functions of the recording media cartridge, e.g. a magnetic tape cassette, as a matter of most importance.

In order to attain the first object described above, the first aspect of the invention provides a recording media cartridge, comprising a case body formed by coupling an upper half and a lower half, a lid for opening and closing a front surface side opening portion of the case body and mounted on the upper half openably and closeably by rotary shafts provided on both side ends of the lid, and a lid urging member having an inflection arm portion between a support end portion engaging with the upper half and an anchor end portion anchored at a front edge inner surface of the lid, wherein the inflection arm portion of the lid urging member is brought into contact with at least one position of the upper half when the lid is opened, and the inflection arm portion is inflected by making at least one position as a point of inflection, whereby the lid is urged in a rotating direction for closing.

Also, the first aspect of the invention provides a recording media cartridge, comprising a case body formed by coupling an upper half and a lower half, a lid for opening and closing a front surface side opening portion of the case body mounted on the upper half openably and closeably by rotary shafts provided on both side ends of the lid, and a lid urging member having a support end portion engaging with the upper half or the lower half and an elastic arm portion that is formed in connection with the support end portion and can be elastically deformed, wherein when the lid is opened, a side surface of the elastic arm portion is pressed by a press rib projecting from a circumferential surface of one of the rotary shafts to thereby elastically deform the elastic arm portion, whereby the lid is urged in a rotating direction for closing.

In this aspect, it is preferable that the lid urging member is a lid spring made of resin. Preferably, the recording media cartridge is a magnetic tape cassette.

In order to attain the second object described above, the second aspect of the invention provides a recording media cartridge, comprising a case body formed by coupling an upper half and a lower half in a lid coupling manner, a recording medium accommodated in the case body, a lid for covering a front surface of the case body, the lid being provided rotatably on the upper half, and a lid urging member for urging the lid in a direction for closing, wherein the lid urging member is made of resin and is retained or fixed between a rotary shaft of the lid and the upper half.

Preferably, the lid urging member made of resin is a lid spring made of resin that is formed of a planar plastic, one end of the lid spring is fixed to a predetermined position of the upper half and an other end of the lid spring is wound around the rotary shaft of the lid or fitted in a slit formed in the rotary shaft.

Preferably, the recording media cartridge is a magnetic tape cassette. Preferably, the recording medium is a magnetic tape and the magnetic tape is would around a tape reel and accommodated in the case body.

In order to attain the third object described above, the third aspect of the invention provides a recording media cartridge, comprising a case body formed by coupling an upper half and a lower half in a lid coupling manner, a recording medium accommodated in the case body, a lid for protecting the recording medium, and a lid spring for urging the lid in a direction for closing, wherein the lid urging member is made of resin and engaged with the lid at a lid anchor portion provided in the upper half.

Preferably, the recording media cartridge is a magnetic tape cassette. Preferably, the recording medium is a magnetic tape and the magnetic tape is would around a tape reel and accommodated in the case body. Also preferably, the lid is mounted rotatably or pivotally on the upper half and covers a front surface of the case body.

The lid urging member is preferably a lid spring, which preferably has a portion that is engaged with the rotary shaft of the lid and portions engageable with the lid or the upper half on both sides thereof.

In this aspect, in order to enhance shape stability of the lid urging member (lid spring) in a plane that is perpendicular to the rotary shaft of the lid, it is preferable to provide a reinforcement member that may also serve to prevent twist at a suitable position as described above. Note that, it is preferable to provide this reinforcement member in parallel to the bent portion that is subjected to the maximum deformation.

In order to smoothly bend the lid urging member, preferably the lid spring, it is preferable that at least one, especially two or more bending assist portions for the lid urging member (lid spring) are provided in the vicinity of a support portion of the upper half for rotatably supporting the rotary shaft of the lid, for example, provided on an extension from the lid anchor portion of the upper half.

It is preferable that at least one bending assist portion is a predetermined number of bending assist portions for the urging member which are provided at predetermined positions.

One or more bending assist portions as above for the lid urging member are preferably provided in predetermined positions in a predetermined number (the plural number). It is also preferred that a bending assist mechanism is provided in the support portion in the upper half for supporting the lid, which facilitates the deformation of the lid urging member (lid spring) as sequentially reaching a plurality of bending assist portions provided.

In this aspect, it is preferable for the enhancement of bending property of the lid urging member (lid spring) itself to provide a predetermined number of bending promotion portions in suitable positions. As such a bending promotion portion, a small-diameter recess portion or throttle portion (each of which may be provided on one or both of the upper and lower surfaces of the lid urging member (lid spring)), a small-diameter bending portion (in a convex form on one side and in a concave form on the other), etc. may suitably be used.

In each aspect of the present invention, the lid urging member is a lid spring made of resin. As the material constituting the lid spring, a rigid resin having a resistance to creep is preferably used. The material for lid spring may be freely selected making much account of its creep resistance, especially when it is to be a resin.

The method for forming such a lid spring may freely be selected also.

Preferably, the lid urging member as a lid spring made of resin is made with POM resin, PBT resin or PAR resin. That is to say, a rigid material having a high creep resistance such as POM (polyoxymethylene) resin, PBT (polybutylene terephthalate) resin and PAR (polyarylate) resin may suitably be used as the material constituting the lid spring as described above, although the present invention is not limited thereto. As for the method for forming the lid spring, various methods including injection molding may suitably be used.

In the description of the recording media cartridge, particularly the magnetic tape cassette, according to each aspect of the present invention, the term "upper" denotes the side where the upper half is located, the term "lower" denotes the side where-the lower half is located, and the term "front" denotes the side where the lid (front lid) is located, and the term "rear" denotes the side opposite to the front side.

In the recording media cartridge according to each aspect of the present invention, the case body has the upper half and the lower half as its main components which comprise other components fitted on the upper half or the lower half, including those fitted on the upper half or the lower half in order to hold or accommodate a magnetic disk, a magneto-optical disk, a tape reel on which a magnetic recording tape is wound and part of the magnetic recording tape drawn out of the tape reel, and so on. For instance, the upper half of the magnetic tape cassette shown in FIG. 26 and described before comprises several other components including the lid fitted on the upper half, the case body being made by combining the upper half as such and the lower half with each other.

In the recording media cartridge according to each aspect of the present invention, the lid provided for opening and closing of the case body may be composed of a single member as, for instance, the lid in the upper half of the magnetic tape cassette shown in FIG. 26, or alternatively, it may have a configuration comprising a plurality of members such as an outer lid, an upper lid and an inner lid in combination.

In the recording media cartridge, particularly the magnetic tape cassette, according to each aspect of the present invention, the lid is fitted on the front edge of the upper half with the rotary shafts provided at both lateral ends of the lid in such a manner that it can freely be opened or closed. When opened, the lid is urged in the direction for closing by means of the lid urging member (lid spring).

In the recording media cartridge according to the first aspect of the present invention, in particular, the lid urging member (lid spring) has the support end portion engaged with the upper half or the lower half and the lid is urged in the direction for closing with the reaction against the deformation of the inflection arm portion or elastic arm portion formed in connection with the support end portion.

Particular examples of the configuration of the cartridge as above include the following.

1) The configuration comprising the lid urging member which has the inflection arm portion between the support end portion engaged with the upper half and the anchorage end portion anchored to the inner surface of the front edge of the lid. When the lid is opened, the inflection arm portion of the lid urging member abuts against at least one location in the upper half and is inflected at the abutting location regarded as an inflection point to provide the urging force.

2) The configuration comprising the lid urging member which has the support end portion engaged with the upper half or the lower half and the elastic arm portion that is formed in connection with the support end portion and is elastically deformable. When the lid is opened, the side surface of the elastic arm portion is pressed by the pressure rib projecting from the circumferential surface of the rotary shaft, then the elastic arm portion is elastically deformed to provide the urging force.

The lid urging member as described above is not particularly limited so long as an inflection arm portion or an elastic arm portion can be formed in it. The material for it may be either metal or resin. The lid urging member made of resin, in particular, is effective in view of the reduction in environmental impact upon the recycle, disposal, etc. of resins, because it makes the sorting and collection of resin materials easier when the recording media cartridge, e.g. the magnetic tape cassette, is disassembled and disposed of.

Further, it will be advantageous if a reel lock member operating in accordance with the deformation of the lid urging member is arranged to lock or release the tape reel corresponding to the closing or opening of the lid.

A magnetic tape cassette used as the recording media cartridge according to each aspect of the present invention is not particularly limited so far as it has a case body composed of an upper half and a lower half coupled with each other and a lid for opening/closing an opening portion provided in a front surface of the case body as the position through which the magnetic tape travels. Any magnetic tape cassette may be used including a magnetic tape cassette whose structure and dimension are standardized in, for example, JIS X6127, X6129 or X6130, or ECMA-288, and such other magnetic tape cassettes as having underneath the lower half other components, e.g. a slider.

Note that, as for the making of the respective urging springs of the reel lock mechanism and the lid lock mechanism described in "Description of the Related Art" of the present specification with a resin, various types of specific configurations are proposed in the patent applications by the same applicant as the present application.

BRIEF DESCRIPTION OF THE DRAWINGS

In the accompanying drawings:

FIG. 1A is a schematic cross-sectional view showing a closing state of a lid in a structural example of a magnetic tape cassette in accordance with one structural example according to one embodiment of one aspect of the present invention and FIG. 1B is a schematic cross-sectional view showing an open state of the lid;

FIG. 2A is a schematic cross-sectional view showing a closing state of a lid in another structural example of a magnetic tape cassette according to the present invention and FIG. 2B is a schematic cross-sectional view showing an open state of the lid;

FIG. 3A is a schematic cross-sectional view showing a closing state of a lid in another structural example of a magnetic tape cassette according to the present invention and FIG. 3B is a schematic cross-sectional view showing an open state of the lid;

FIG. 4A is a schematic cross-sectional view showing a closing state of a lid in another structural example of a magnetic tape cassette according to the present invention and FIG. 4B is a schematic cross-sectional view showing an open state of the lid;

FIG. 5A is a schematic cross-sectional view showing a closing state of a lid in another structural example of a magnetic tape cassette according to the present invention and FIG. 5B is a schematic cross-sectional view showing an open state of the lid;

FIG. 6A is a schematic cross-sectional view showing a closing state of a lid in another structural example of a magnetic tape cassette according to the present invention and FIG. 6B is a schematic cross-sectional view showing an open state of the lid;

FIG. 9A is a schematic cross-sectional view showing a closing state of a lid in another structural example of a magnetic tape cassette according to the present invention and FIG. 9B is a schematic cross-sectional view showing an open state of the lid;

FIG. 10A is a schematic cross-sectional view showing a closing state of a lid in another structural example of a magnetic tape cassette according to the present invention and FIG. 10B is a schematic cross-sectional view showing an open state of the lid;

FIG. 13A is a perspective view of a lid spring and FIG. 13B is a perspective view of a mounting shaft for anchoring the lid spring;

FIGS. 15A and 15B are partially cross-sectional, enlarged side views showing a mounted state of a lid and a lid spring, respectively, in an example of a magnetic tape cassette according to one embodiment of another aspect of the present invention;

FIGS. 17A and 17B, respectively, are side views showing a deformed state of the lid spring shown in FIG. 16;

FIGS. 24A and 24B, respectively, are side views showing shapes of lid springs in another example of the present invention;

FIG. 25 is a partially cross-sectional, enlarged side view showing a mounted state of a lid and a lid spring in another example of a magnetic tape cassette according to the present invention;

FIG. 31A shows the closing state and FIG. 31B shows the open state of the lid;

DESCRIPTION OF THE PREFERRED EMBODIMENT

A recording media cartridge according to the present invention will be described in detail with reference to the preferred embodiments shown in the accompanying drawings.

In the following description, a recording media cartridge according to the present invention is described by using a magnetic tape cassette as a typified example. Needless to say, however, this is not the sole case and the present invention is not limited to this case.

Figure 26:
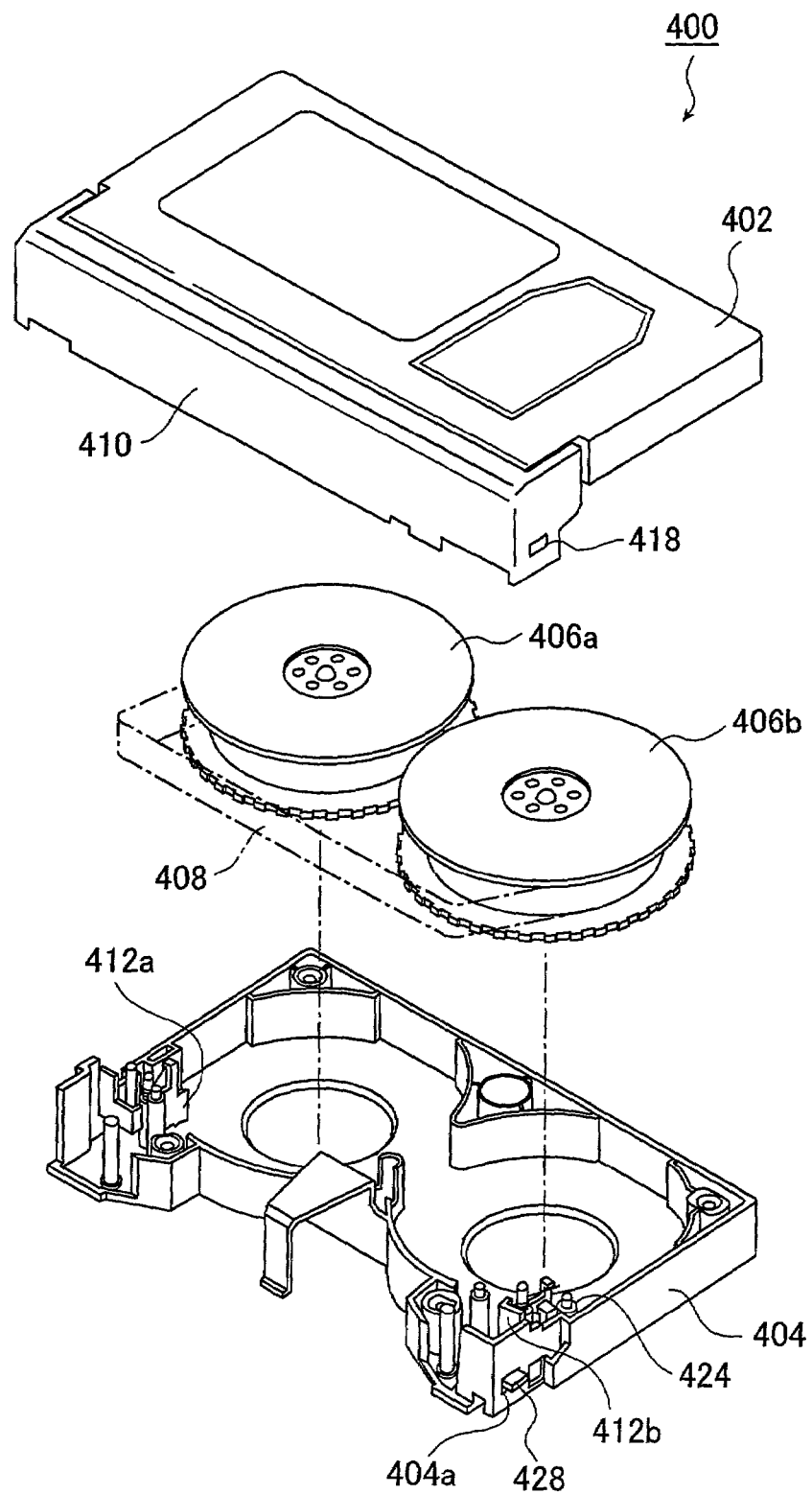
FIG. 26 is a partially exploded perspective view showing a structure of a conventional general magnetic tape cassette.
Figure 27:
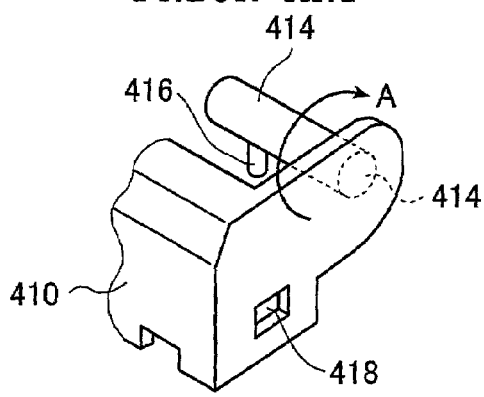
FIG. 27 is a perspective view showing one end portion of the magnetic tape cassette shown in FIG. 26.
Figure 28:
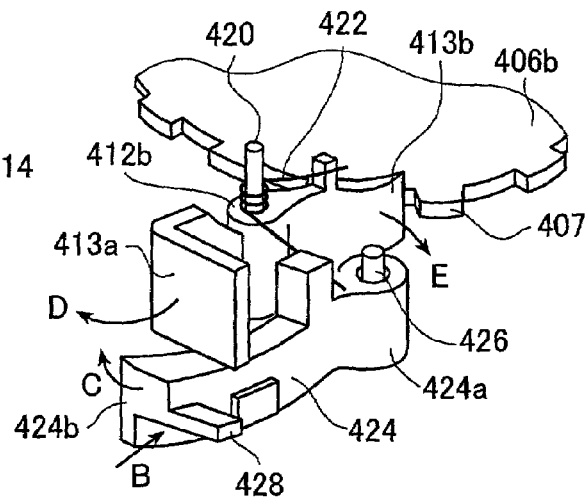
FIG. 28 is an enlarged perspective view showing the vicinity of a reel lock portion of the magnetic tape cassette shown in FIG. 26.
Figure 29:
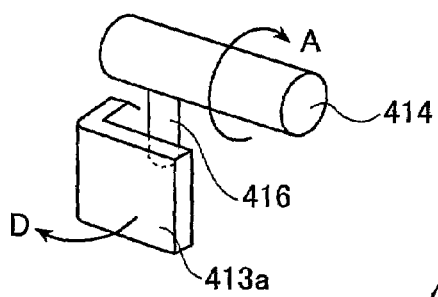
FIG. 29 is an enlarged perspective view showing the vicinity of a lid lock portion of the magnetic tape cassette shown in FIG. 26.
Figure 30:
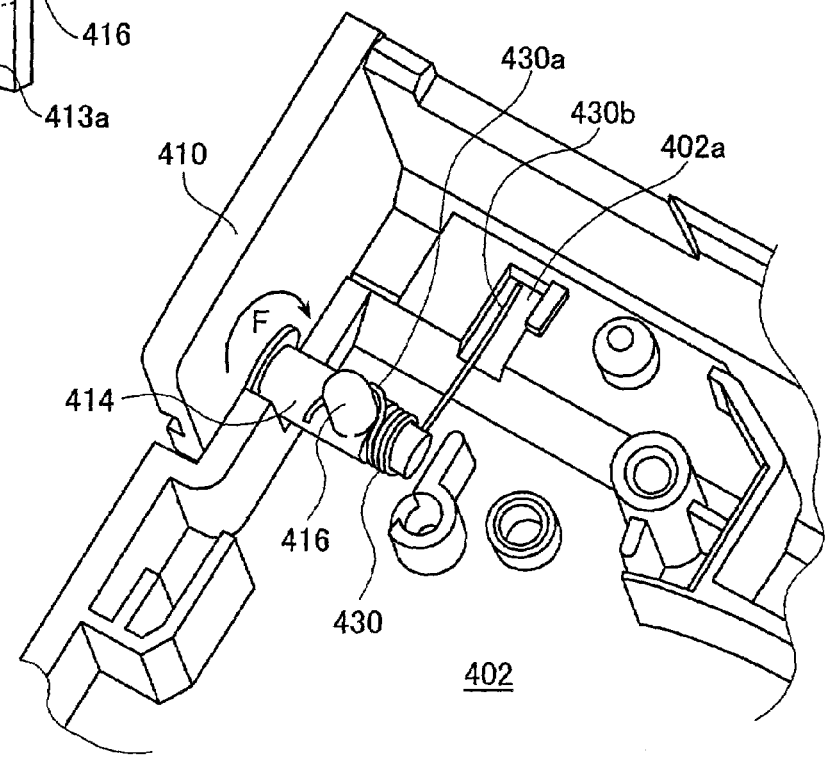
FIG. 30 is a perspective view showing a mounted state of the lid spring for urging the lid in a closing direction of the magnetic tape cassette shown in FIG. 26.
Figure 31A:
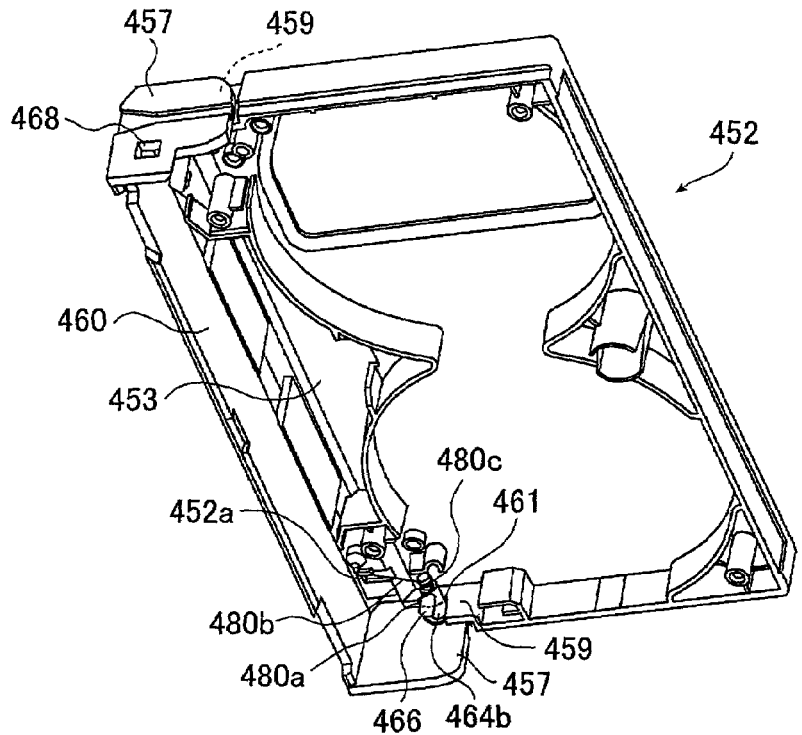
FIGS. 31A and 31B are perspective views that show the inner surface of the lid mounted to the upper half and the lower half of the conventional magnetic tape cassette, where
Figure 31B:
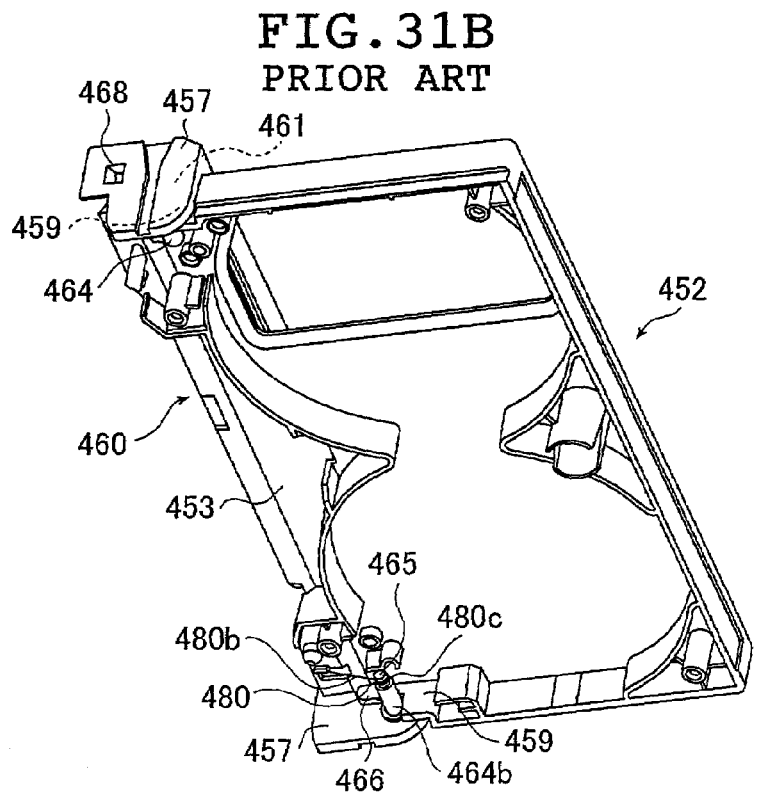

With reference to FIGS. 1 to 11, a recording media cartridge in the first aspect of the invention will now be described with an example of a structure of an upper half and a lid of a magnetic tape cassette (hereinafter simply referred to as a cassette). Incidentally, in the following description, the upper half and the lid will be mainly described. Members and parts constituting the cassette other than the upper half and the lid, for example, the upper half and each of other members and parts shown in FIG. 26 are not particularly limited, and the like ones or different ones may be used. The explanation therefor will be omitted.

FIGS. 1A and 1B are schematic cross-sectional views showing states that a lid 3 mounted on an upper half 1 is closed and opened in a structural example of a magnetic tape cassette according to an embodiment of the first aspect of the invention.

In the upper half 1 shown in these FIGS. 1A and 1B, the lid 3 is adapted to open and close a front surface side opening portion of a case body formed by coupling the upper half 1 and a lower half (not shown). The lid 3 is mounted on the upper half 1 by rotary or pivotal shafts (not shown) provided on both side surfaces of the lid 3 and is urged or biased in a direction for closing by a lid urging member (hereinafter referred to as lid spring).

The upper half 1 has a recess-like engagement support portion 13 formed within an inner surface 11 of a slant portion 9 of a front edge end 7 thereof. The lid 3 has an anchor (engaging and fastening) portion 19 having an L-shape in its cross section formed on an inner surface 17 of a front plate 15 thereof.

Also, the lid spring 5 has at one end a support end portion 23 passing through a through-hole 21 formed within the above-described slant portion 9, bent so as to surround the inner surface of the slant portion 9 and engaged at a tip end thereof with an engagement support portion 13, and has at the other end an anchor end portion 25 fitted into and anchored (engaged and fastened) at the above-described anchor portion 19 and an inflection arm portion 27 inflectable between the support end portion 23 and the anchor end portion 25.

In the upper half 1 of the magnetic tape cassette on which this lid spring 5 is mounted, as shown in FIG. 1A, under the state that the font lid 3 is closed, the opening and closing of the lid 3 is locked by means of a lid lock member (not shown) provided on the lower half.

In order to bring this lid 3 into the open state shown in FIG. 1B, the lid lock member (not shown) provided on the lower half is released and the lid 3 is rotated or pivoted about rotary (pivotal) shafts to be lifted upward, whereby a front opening portion of the case body is kept under the open state and the lid 3 is urged in a rotating direction for closing by the lid spring 5. At this time, in the lid spring 5, the inflection arm portion 27 thereof is brought into contact with a front edge 30 of the upper plate of the upper half 1 as shown in FIG. 1B, is deformed through inflection at the inflection arm portion 27 by making the contact portion as a point of inflection, and the lid spring 5 is urged in a rotating direction for closing the lid 3, i.e., a direction as indicated by an arrow A by the resistance force against this deformation.

Further, FIGS. 2A and 2B are schematic cross-sectional views showing states that a lid 33 mounted on an upper half 31 is opened and closed in another structural example according to this aspect under consideration.

In the upper half 31 shown in FIGS. 2A and 2B, the lid 33 is adapted to open and close a front surface side opening portion of a case body obtained by coupling the upper half 31 and a lower half (not shown), mounted on the upper half 31 by rotary shafts (not shown) provided on both side surfaces of the lid 33 and urged in a rotating direction for closing by means of a lid spring 35.

The upper half 31 has a recess-like engagement support portion 43 formed within an inner surface 41 of a slant portion 39 of a front edge end 37 thereof. The lid 33 has an anchor portion 49 having an L-shape in its cross section formed on an inner surface 47 of a front plate 45 thereof.

Also, the lid spring 35 has at one end a support end portion 53 passing through a through-hole 51 formed within the above-described slant portion 39, bent so as to surround the inner surface of the slant portion 39 and engaged at a tip end thereof with an engagement support portion 43, and has at the other end an anchor end portion 55 fitted into and anchored at the above-described anchor portion 49 and between the support end portion 53 and the anchor end portion 55 an inflection arm portion 59 inflectable and passing through the through-hole 51, which is provided with the front edge end 37 of the upper half 31.

In the upper half 31 of the magnetic tape cassette on which this lid spring 35 is mounted, as shown in FIG. 2A, under the state that the font lid 33 is closed, the opening and closing of the lid 33 is locked by means of a lid lock member (not shown) provided in the lower half.

In order to bring this lid 33 into the open state shown in FIG. 2B, the lid lock member (not shown) provided on the lower half is released and the lid 33 is rotated about the rotary shafts to be lifted upward so that the front opening portion of the case body is kept under the open state, and the lid 33 is urged in a rotating direction for closing by the lid spring 35. At this time, the lid spring 35 is brought into contact with a front edge 60 of the upper plate of the upper half 31 as shown in FIG. 2B, is deformed at an inflection arm portion 59 by making the contact portion as a point of inflection and is urged in a rotating direction for closing the lid 33, i.e., a direction as indicated by an arrow A by the resistance force against this deformation.

Also, FIGS. 3A and 3B are schematic cross-sectional views showing states that a lid 63 mounted on an upper half 61 is closed and opened in another structural example of the magnetic tape cassette according to this aspect under consideration.

In the upper half 61 shown in FIGS. 3A and 3B, the lid 63 is adapted to open and close a front surface side opening portion of a case body obtained by coupling the upper half 61 and a lower half (not shown), mounted on the upper half 61 by rotary shafts (not shown) provided on both side surfaces of the lid 63 and urged in a rotating direction for closing by means of a lid spring 65.

The upper half 61 has a recess-like engagement support portion 71 formed within an upper end surface 69 of a front edge end 67 thereof. The lid 63 has an anchor portion 77 having an L-shape in its cross section and formed on an inner surface 75 of its front plate 73.

Also, the lid spring 65 has at one end a support end portion 79 bent so as to surround a tip end of the above-described front edge end 67 with a tip end thereof engaging with the engagement support portion 71, and has at the other end an anchor end portion 81 fitted into and anchored at the above-described anchor portion 77 and an inflection arm portion 83 inflectable between a support end portion 79 and the anchor end portion 81. The inflection arm portion 83 has a bent portion 85 having a U-shape in its cross section. This bent portion 85 is fitted in a fitting member 87 provided on the lower surface of the front edge end 67 and brought into contact with the front edge end 67 of the upper half 61.

In the upper half 61 of the magnetic tape cassette on which this lid spring 65 is mounted, as shown in FIG. 3A, under the state that the font lid 63 is closed, the opening and closing of the lid 63 is locked by means of a lid lock member (not shown) provided in the lower half. In order to bring this lid 63 into the open state shown in FIG. 3B, the lid lock member (not shown) provided on the lower half is released and the lid 63 is rotated about the rotary shafts to be lifted upwardly so that the front opening portion of the case body is kept under the open state, and the lid 63 is urged in a rotating direction for closing by the lid spring 65. At this time, the curved arm portion 83 of the lid spring 65 is inflected and deformed upward from the front edge end 67 of the upper half 61 as shown in FIG. 3B, and is urged in a rotating direction for closing the lid 63, i.e., a direction as indicated by an arrow A by the resistance force against this deformation.

Also, FIGS. 4A and 4B are schematic cross-sectional views showing states that a lid 93 mounted on an upper half 91 is closed and opened in another structural example of the magnetic tape cassette according to this aspect under consideration.

In the upper half 91 shown in FIGS. 4A and 4B, the lid 93 is adapted to open and close a front surface side opening portion of a case body obtained by coupling the upper half 91 and a lower half (not shown), mounted on the upper half 91 by rotary shafts (not shown) provided on both side surfaces of the lid 93 and urged in a rotating direction for closing by means of the lid spring 95.

The upper half 91 has a recess-like engagement support portion 103 formed within an inner surface 101 of a slant portion 99 of a front edge end 97 thereof. The lid 93 has an anchor portion 109 having an L-shape in its cross section and formed on a slant portion inner surface 107 of its front plate 105.

Also, the lid spring 95 has at one end a support end portion 113 passing through a through-hole 111 formed within the above-described slant portion 99, bent so as to surround an inner surface of the slant portion 99 and engaged at a tip end with the engagement support portion 103, and has at the other end an anchor end portion 115 fitted into and anchored at the above-described anchor portion 109 and an inflection arm portion 117 inflectable between a support end portion 113 and the anchor end portion 115.

In the upper half 91 of the magnetic tape cassette on which this lid spring 95 is mounted, as shown in FIG. 4A, under the state that the lid 93 is closed, the opening and closing of the lid 93 is locked by means of a lid lock member (not shown) provided in the lower half. In order to bring this lid 93 into the open state shown in FIG. 4B, the lid lock member (not shown) provided on the lower half is released and the lid 93 is rotated about the rotary shafts to be lifted upward so that the front opening portion of the case body is kept under the open state, and the lid 93 is urged in a rotating direction for closing by the lid spring 95. At this time, the lid spring 95 is brought into contact with a front edge 120 of the upper plate of the upper half 91 as shown in FIG. 4B, is deformed at the inflection arm portion 117 by making the contact portion as a point of inflection and is urged in a rotating direction for closing the lid 93, i.e., a direction as indicated by an arrow A by the resistance force against this deformation.

Next, FIGS. 5A and 5B are schematic cross-sectional views showing states that a lid 123 mounted on an upper half 121 is closed and opened in another structural example of the magnetic tape cassette according to this aspect under consideration.

In the upper half 121 shown in FIGS. 5A and 5B, the lid 123 is adapted to open and close a front surface side opening portion of a case body obtained by coupling the upper half 121 and a lower half (not shown), mounted on the upper half 121 by rotary shafts 124 provided on both side surfaces of the lid 123 and urged in a rotating direction for closing by means of the lid spring 125.

A support end portion 129 provided at one end of the lid spring 125 is engaged with the rotary shaft 124 projecting from a side wall inner surface of the upper half 121. The lid 123 has an anchor portion 137 having an L-shape in its cross section and formed on a lower end inner surface 135 of its front plate 133.

Also, in the lid spring 125, the support end portion 129 is anchored at the rotary shaft 124 and an anchor end portion 139 at the other end is fitted into and anchored at an anchor portion 137. The lid spring 125 has an inflection arm portion 141 inflectable between the support end portion 129 and the anchor end portion 139. A bent portion 145 of this inflection arm portion 141 is in contact with a front edge end 143.

In the upper half 121 of the magnetic tape cassette on which this lid spring 125 is mounted, as shown in FIG. 5A, under the state that the font lid 123 is closed, the opening and closing of the lid 123 is locked by means of a lid lock member (not shown) provided in the lower half. In order to bring this lid 123 into the open state shown in FIG. 5B, the lid lock member (not shown) provided on the lower half is released and the lid 123 is rotated about the rotary shafts 124 (including the rotary shaft on the opposite side) to be lifted upward so that the front opening portion of the case body is kept under the open state and the lid 123 is urged in a rotating direction for closing by the lid spring 125. At this time, in the lid spring 125, the inflection arm portion 141 is brought into contact with a front edge 146 of the upper plate of the upper half 121 as shown in FIG. 5B, is deformed at the inflection arm portion 141 by making the contact portion as a point of inflection and is urged in a rotating direction for closing the lid 123, i.e., a direction as indicated by an arrow A by the resistance force against this deformation.

Also, FIGS. 6A and 6B are schematic cross-sectional views showing states that a lid 183 mounted on an upper half 181 is closed and opened in another structural example according to this aspect under consideration.

In the upper half 181 shown in FIGS. 6A and 6B, the lid 183 is adapted to open and close a front surface side opening portion of a case body obtained by coupling the upper half 181 and a lower half (not shown), mounted on the upper half 181 by rotary shafts (not shown) provided on both side surfaces of the lid 183 and urged in a rotating direction for closing by means of the lid spring 185.

The upper half 181 has anchor support portions 191a and 191b on a lower surface 189 of a front edge end 187 thereof. The lid 183 has an anchor portion 197 having an L-shape in its cross section and formed on an upper portion inner surface 195 of its front plate 193.

Also, the lid spring 185 has at one end a support arm portion 199 inserted into and anchored at the above-described anchor support portions 191a and 191b, and has at the other end an anchor end portion 201 fitted into and anchored at the above-described anchor portion 197 and has an inflection arm portion 203 inflectable between a support arm portion 199 and the anchor end portion.

In the upper half 181 of the magnetic tape cassette on which this lid spring 185 is mounted, as shown in FIG. 6A, under the state that the lid 183 is closed, the opening and closing of the lid 183 is locked by means of a lid lock member (not shown) provided in the lower half.

In order to bring this lid 183 into the open state shown in FIG. 6B, the lid lock member (not shown) provided on the lower half is released and the lid 183 is rotated about the rotary shafts to be lifted upward so that the front opening portion of the case body is kept under the open state and the lid 183 is urged in a rotating direction for closing by the lid spring 185. At this time, the lid spring 185 is inserted into and pulled out successively while the support arm portion 199 is being anchored at the anchor support portions 191a and 191b and the inflection arm portion 203 is brought into contact with a front edge 205 of the upper plate of the upper half 181 as shown in FIG. 6B, is deformed at the inflection arm portion 203 by making the contact portion as a point of inflection and is urged in a rotating direction for closing the lid 183, i.e., a direction as indicated by an arrow A by the resistance force against this deformation.

Figure 7A:
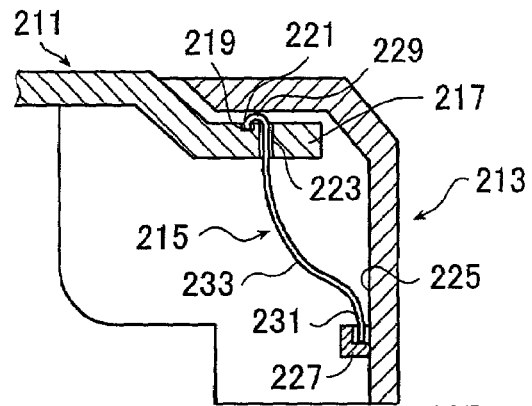
FIG. 7A is a schematic cross-sectional view showing a closing state of a lid in another structural example of a magnetic tape cassette according to the present invention and FIG. 7B is a schematic cross-sectional view showing an open state of the lid.
Figure 7B:
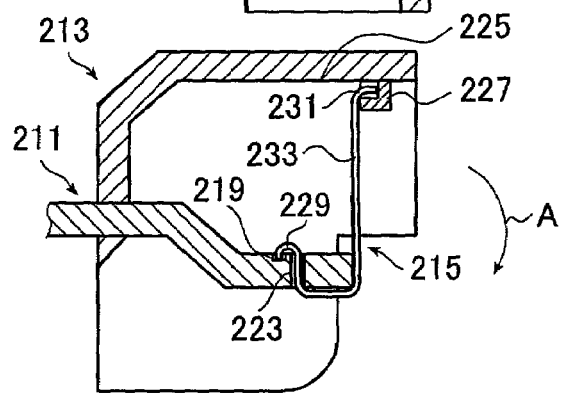

FIGS. 7A and 7B are schematic cross-sectional views showing states that a lid 213 mounted on an upper half 211 is closed and opened in another structural example of the magnetic tape cassette according to this aspect under consideration.

In the upper half 211 shown in FIGS. 7A and 7B, the lid 213 is adapted to open and close a front surface side opening portion of a case body obtained by coupling the upper half 211 and a lower half (not shown), mounted on the upper half 211 by rotary shafts (not shown) provided on both side surfaces of the lid 213 and urged in a rotating direction for closing by means of the lid spring 215.

The upper half 211 has a recess-like engagement support portion 221 formed within an upper surface 219 of a front edge end 217 thereof and a through-hole 223. The lid 213 has an anchor portion 227 having an L-shape in its cross section and formed on a lower portion of an inner surface 225 of its front plate.

Also, the lid spring 215 has at one end a support end portion 229 being bent by passing through the through-hole 223 formed within an upper surface 219 of the above-described front edge end 217 and engaged at a tip end thereof with an engagement support portion 221 and has at the other end an anchor end portion 231 fitted into and anchored at the above-described anchor portion 227 and an inflection arm portion 233 inflectable between the support end portion 229 and the anchor end portion 231.

In the upper half 211 of the magnetic tape cassette on which this lid spring 215 is mounted, as shown in FIG. 7A, under the state that the lid 213 is closed, the opening and closing of the lid 213 is locked by means of a lid lock member (not shown) provided on the lower half.

In order to bring this lid 213 into the open state shown in FIG. 7B, a lid lock member (not shown) provided on the lower half is released and the lid 213 is rotated about the rotary shafts to be lifted upward so that the front opening portion of the case body is kept under the open state and the lid 213 is urged in a rotating direction for closing by the lid spring 215. At this time, the support end portion 229 of the lid spring 215 engaged at a tip end thereof with the engagement support portion 221 is bent by passing through the through-hole 223. As shown in FIG. 7B, the inflection arm portion 233 is inflected in contact with the lower surface and the front end of a front edge end 217 and is deformed at an inflection arm portion 233 by making the contact portion as a point of inflection and is urged in a rotating direction for closing the lid 213, i.e., a direction as indicated by an arrow A by the resistance force against this deformation.

Figure 8A:
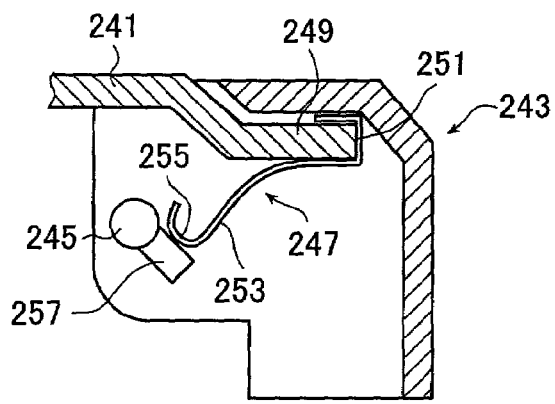
FIG. 8A is a schematic cross-sectional view showing a closing state of a lid in another structural example of a magnetic tape cassette according to the present invention and FIG. 8B is a schematic cross-sectional view showing an open state of the lid.
Figure 8B:
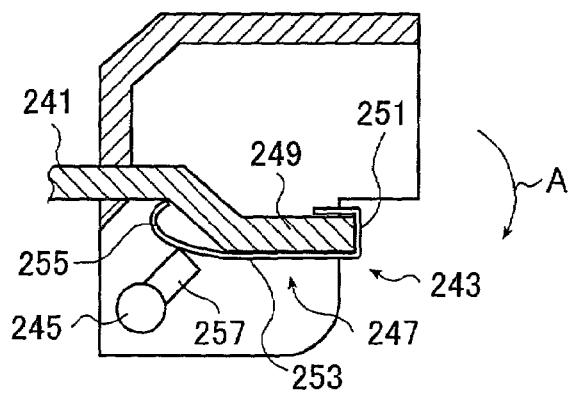

FIGS. 8A and 8B are schematic cross-sectional views showing states that a lid 243 mounted on an upper half 241 is closed and opened in another structural example of the magnetic tape cassette according to this aspect under consideration.

In the upper half 241 shown in FIGS. 8A and 8B, the lid 243 is adapted to open and close a front surface side opening portion of a case body obtained by coupling the upper half 241 and a lower half (not shown), mounted on the upper half 241 by rotary shafts 245 provided on both side surfaces of the lid 243 and urged in a rotating direction for closing by means of a lid spring 247.

The lid spring 247 has at one end a support end portion 251 engaged with a front edge end 249 of the upper half 241, an elastic arm portion 253 that is formed in connection with this support end portion 251 and elastically deformable, and has at the other end a curved end portion 255 as a free end. The side surface of the elastic arm portion 253 is brought into contact with a pressure rib 257 projecting from a circumferential surface of the rotary shaft 245.

In the upper half 241 of the magnetic tape cassette on which this lid spring 247 is mounted, as shown in FIG. 8A, under the state that the lid 243 is closed, the opening and closing of the lid 243 is locked by means of a lid lock member (not shown) provided on the lower half.

In order to bring this lid 243 into the open state shown in FIG. 8B, the lid lock member (not shown) provided on the lower half is released and the lid 243 is rotated about the rotary shafts 245 to be lifted upward so that the front opening portion of the case body is kept under the open state and the lid 243 is urged in a rotating direction for closing by the lid spring 247. At this time, in the lid spring 247, the pressure rib 257 is rotated in accordance with the rotation of the rotary shafts 245. A tip end of this pressure rib 257 pushes this elastic arm portion 253 while sliding along the side surface of the elastic arm portion 253 so that the elastic arm portion 253 is elastically deformed as shown in FIG. 8B. The lid 243 is urged in a rotating direction for closing the lid 243, i.e., a direction as indicated by an arrow A by the resistance force against this elastic deformation.

Also, FIGS. 9A and 9B are schematic cross-sectional views showing states that a lid 263 mounted on an upper half 261 is closed and opened in another structural example of the magnetic tape cassette according to the present invention.

In the upper half 261 shown in FIGS. 9A and 9B, the lid 263 is adapted to open and close a front surface side opening portion of a case body obtained by coupling the upper half 261 and a lower half (not shown), mounted on the upper half 261 by rotary shafts 265 provided on both side surfaces of the lid 263 and urged in a rotating direction for closing by means of the lid spring 267.

The lid spring 267 has at one end a support end portion 275 fitted into and engaged with an engagement support portion 273 provided in an inner surface 271 of an upper plate 269 of the upper half 261 and an elastic arm portion 277 that is formed in connection with this support end portion 275 and elastically deformable, and has at the other end a curved portion 279 as a free end. The side surface of the elastic arm portion 277 is brought into contact with a tip end of a pressure rib 280 projecting from a circumferential surface of a rotary shaft 265.

In the upper half 261 of the magnetic tape cassette on which this lid spring 267 is mounted, as shown in FIG. 9A, under the state that the lid 263 is closed, the opening and closing of the lid 263 is locked by means of a lid lock member (not shown) provided in the lower half.

In order to bring this lid 263 into the open state shown in FIG. 9B, a lid lock member (not shown) provided on the lower half is released and the lid 263 is rotated about the rotary shafts 265 to be lifted upward so that the front opening portion of the case body is kept under the open state and the lid 263 is urged in a rotating direction for closing by the lid spring 267. At this time, in the lid spring 267, the pressure rib 280 is rotated in accordance with the rotation of the rotary shafts 265. A tip end of this pressure rib 280 pushes an elastic arm portion 277 while sliding along the side surface of the elastic arm portion 277 so that the elastic arm portion 277 is elastically deformed as shown in FIG. 9B. The lid 263 is urged in a rotating direction for closing the lid 263, i.e., a direction as indicated by an arrow A by the resistance force against this elastic deformation.

FIGS. 10A and 10B are schematic cross-sectional views showing states that a lid 283 mounted on an upper half 281 is closed and opened in another structural example of the magnetic tape cassette according to this aspect under consideration.

In the upper half 281 shown in FIGS. 10A and 10B, the lid 283 is adapted to open and close a front surface side opening portion of a case body obtained by coupling the upper half 281 and a lower half (not shown), mounted on the upper half 281 by rotary shafts 285 provided on both side surfaces of the lid 283 and urged in a rotating direction for closing by means of the lid spring 287.

The lid spring 287 has at one end a sliding anchor end 291 anchored at an upper surface of an anchor sliding portion 289 provided on the lower half (not shown), and has at the other end a support end portion 295 fitted into and anchored at a recess-like anchor portion 293 upwardly provided on the inner surface of the lower half and an elastic arm portion 297 that is curved and elastically deformable between this sliding anchor end 291 and the support end portion 295. The side surface of the elastic arm portion 297 is brought into contact with a tip end of a pressure rib 299 projecting from a circumferential surface of the rotary shaft 285.

In the magnetic tape cassette on which this lid spring 287 is mounted, as shown in FIG. 10A, under the state that the lid 283 is closed, the opening and closing of the lid 283 is locked by means of a lid lock member (not shown) provided in the lower half side.

In order to bring this lid 283 into the open state shown in FIG. 10B, the lid lock member provided on the lower half (not shown) is released and the lid 283 is rotated about the rotary shafts 285 to be lifted upward so that the front opening portion of the case body is kept under the open state and the lid 283 is urged in a rotating direction for closing by the lid spring 287.

At this time, in the lid spring 287, the pressure rib 299 is rotated in accordance with the rotation of the rotary shafts 285. The sliding anchor end 291 is pulled out successively while sliding on the upper surface of the anchor sliding portion 289, and a tip end of this pressure rib 299 pushes an elastic arm portion 297 while sliding along the side surface of the elastic arm portion 297 so that the elastic arm portion 297 is elastically deformed in contact with a lower surface 305 of a front edge end 303 of the upper half 281 in a curved portion 301 of the elastic arm portion 297. The lid 283 is urged in a rotating direction for closing the lid 283, i.e., a direction as indicated by an arrow A by the resistance force against this deformation.

Figure 11A:
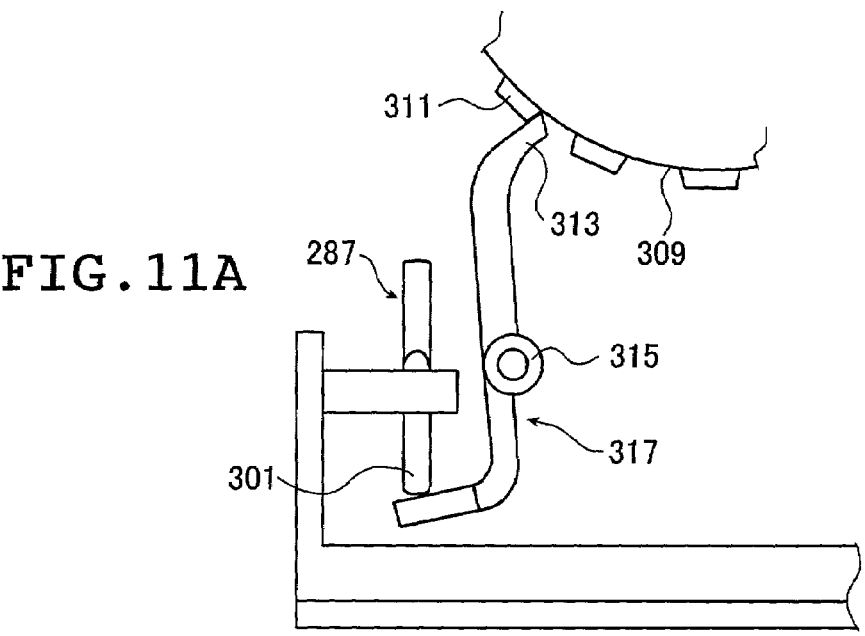
FIG. 11A is a schematic cross-sectional view showing a state of a reel lock member when a lid is closed in an example in which the reel lock member is provided in the structural example of a magnetic tape cassette in accordance with the structural example shown in FIG. 10.
Figure 11B:
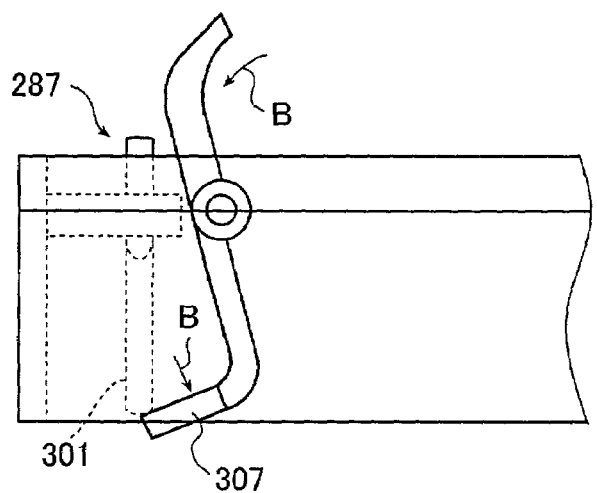
FIG. 11B is a schematic cross-sectional view for explaining action of the reel lock member when the lid is opened.

Also, as shown in FIGS. 11A and 11B, if there are provided at one end an anchor arm portion 307 that is in contact with a curved portion 301 of the elastic arm portion 297 of the above-described lid spring 287, and at the other end a reel lock piece 313 anchored at an anchor pawl 311 of a toothed wheel-like reel brake member 309 provided around a circumference of a lower flange of a tape reel to be received in a case body, and a reel lock member 317 pivotally supported around a rotary rib 315 in a rotatable manner, there is an advantage that it is possible to lock the tape reel and to release the lock of the tape reel by means of the reel lock member 317 in association with opening/closing of the lid 283.

That is, as shown in the aforementioned FIG. 10A, under the state that the lid 283 is closed, the anchor arm portion 307 of the reel lock member 317 is brought into contact with the curved portion 301 of the elastic arm portion 297 of the lid spring 287 as shown in FIG. 11A and, at the same time, the anchor pawl 311 of the reel brake member 309 is anchored at the reel lock piece 313 of the reel lock member 317 to thereby lock the rotation of the tape reel.

Also, in a case where the lid 283 is rotated about the rotary shafts 285 to be lifted upward to obtain the state that the front opening portion of the case body is opened as shown in FIG. 10B, the curved portion 301 of the elastic arm portion 297 pressed by the tip end of the pressure rib 299 is brought into contact with the lower surface 305 of the front edge end 303 of the upper half 281 and, at the same time, the anchor arm portion 307 of the reel lock member 317 is pressed as shown in FIG. 11B. The anchor arm portion 307 is pressed so that the reel lock member 317 is rotated about the rotary rib 315 in a direction indicated by an arrow B. The anchoring between the reel lock piece 313 and the anchor pawl is released, and thus the lock of the reel brake member 309 is released.

As described above, in the magnetic tape cassette having various kinds of lid urging members (lid springs) shown in FIGS. 1 to 11, it is easier to assemble the lid spring into the case body in comparison with a conventional lid urging spring made of a torsion spring or the like, it is possible to enhance assembling property of the magnetic tape cassette. Also, in a case where a lid spring made of a resin material is used, in addition to easiness in molding, there are advantages that it is easy to sort and collect the resin material and it is effective to reduce environmental impactsal when disassembling the magnetic tape cassette.

Figure 12:
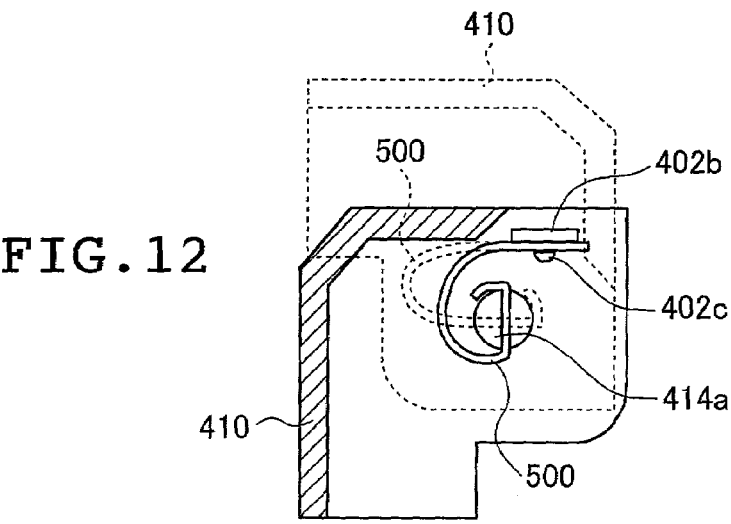
FIG. 12 is a view showing an outline of a mounted state of a lid spring in an example of a magnetic tape cassette according to one embodiment of another aspect of the present invention and its operation.

With reference to FIGS. 12 to 14, a recording media cartridge in the second aspect of the invention will be next described using an example of a magnetic tape cassette in accordance with an embodiment, to which the invention is applied. In any of embodiments which will be described in the following, the conventional lid urging member (hereafter, referred to as lid spring) employing a metal-made part is changed to a spring made of plastics, whereby the number of steps in assembling is decreased and labor is reduced for sorting upon disassembling and wasting the spring, with contribution to the reduction in environmental impacts.

Figure 13A:
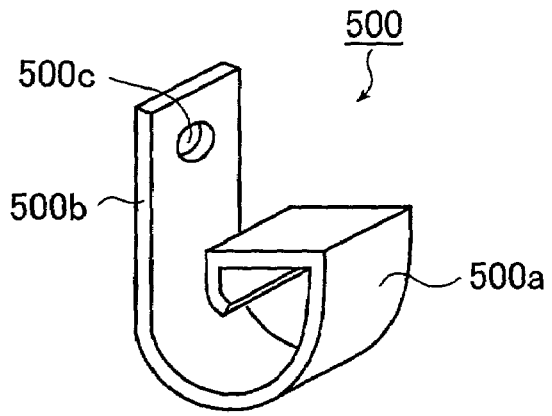
FIGS. 13A and 13B are views showing a detail of the embodiment shown in FIG. 12, where
Figure 13B:
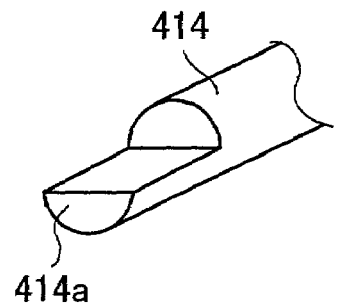

Here, FIG. 12 is a view showing an outline of an assembled state of a lid spring that is a lid urging member in an example according to a magnetic tape cassette in accordance with one embodiment of the second aspect of the invention. FIG. 13A and FIG. 13B are diagrams showing details of the above, where FIG. 13A is a perspective view showing the lid spring and FIG. 13B is a perspective view showing a primary part of a mounting shaft for anchoring the lid spring. The magnetic tape cassette shown in FIGS. 12, 13A, and 13B has the same structure as of the magnetic tape cassette 400 shown in FIG. 26 except the lid spring and its mounting structure; here the lid spring and its mounting structure will mainly be shown employing the same reference numerals for the equivalent constituent parts, and the detailed descriptions of which will be omitted.

The lid spring 500 in the present example is obtained by bending a planar plastic material as shown in FIG. 12 and FIGS. 13A and 13B. One end thereof is a plane plate portion 500b having a hole 500c and the other end 500a has a shape in conformity with a machined shape (substantially semi-cylindrical shape) of a mounting shaft (rotary or pivotal shaft serving as a rotary center of the above-described lid 410) 414, which will be described later (refer to FIG. 26 to FIG. 30).

A folded portion 500a at an end portion of the lid spring 500 is anchored at a portion 414a having a tip end portion of the pivot shaft 414 formed in a semi-cylindrical shape. Also, the other end 500b is anchored through a method such as welding or caulking (indicated by a reference symbol 402c) of a lid spring anchoring portion 402b provided in a predetermined position of the upper half 402 or the like, and thus the lid spring 500 is anchored between the upper half 402 and the lid 410.

FIG. 12 shows this state (indicated by solid lines) and a state that the lid lock is released from this state and the lid 410 is rotated by 90 degrees to be opened (indicated by broken lines). The lid spring 500 is largely bent to be a U-shape and accumulates a spring force during this operation. Then, the lid 410 is closed due to this accumulated force when a force for opening the lid 410 is removed.

Since the lid spring 500 in accordance with the present embodiment is structured as described above, there are advantages that the mounting and removing thereof are simple and the operation is securely performed.

Figure 14A:
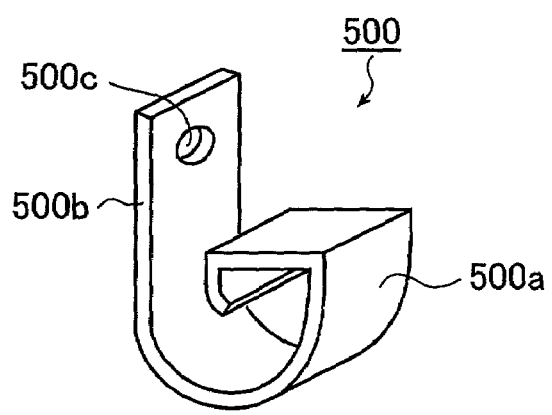
FIG. 14A is a perspective view showing a lid spring of a magnetic tape cassette according to another embodiment of the present invention and FIG. 14B is a perspective view showing a mounting shaft for anchoring the lid spring.
Figure 14B:
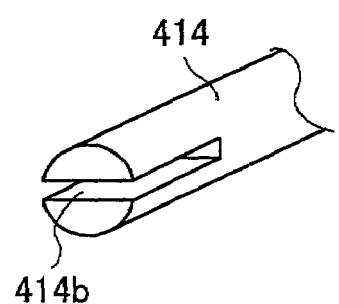

FIGS. 14A and 14B are related to another embodiment of the invention, where FIG. 14A is a perspective view of the lid spring 500 and FIG. 14B is a perspective view showing a primary part of a mounting shaft for anchoring this. The lid spring 500 per se is the same as those shown in the foregoing examples. However, in this example, a method for mounting it is different from that in case of the foregoing examples.

That is, in the foregoing example, the bent portion of one end 500a of the lid spring 500 is anchored at the semi-cylindrical portion 414a at the tip end of the pivot shaft 414. In contrast to this, in this example, a tip end of a pivot shaft 414 is formed into a cylindrical shape without adding any change and a slit is formed therein to thereby make a shape 414b, with one end 500a of the lid spring 500 being inserted into and anchored at the slit.

The lid spring 500 according to the present example is thus constructed. Accordingly, the mounting and removing thereof are simple as in the lid spring according to the foregoing examples and, at the same time, the anchoring becomes securer advantageously.

Since the cassette shown in this example may easily be assembled into the case body, it is effective in improving assembling property of the magnetic tape cassette and it is possible to form the lid spring using the resin material without using a spring member made of metal. In addition, the spring is made of the resin material as described above, whereby the sorting and collection of the resin material are easy and it is effective to reduce the environmental impacts.

In this aspect, the anchoring method of the aforementioned lid spring made of resin (plastic) to the upper half or the lid is not limited to what is shown in the above example and another anchoring method may be employed in this embodiment.

With reference to FIGS. 15 to 25, a recording media cartridge in the third aspect of the invention will be next described using an example of a magnetic tape cassette in accordance with an embodiment, to which the invention is applied. In the embodiment which will be described later, this aspect is shown in which the present invention is applied to a DVC (Digital Video Cassette) that is one example of a magnetic tape cassette, and the description on the overall structure of the magnetic tape cassette which has already been mentioned above will be omitted and only the essential points will be described.

Figure 33A:
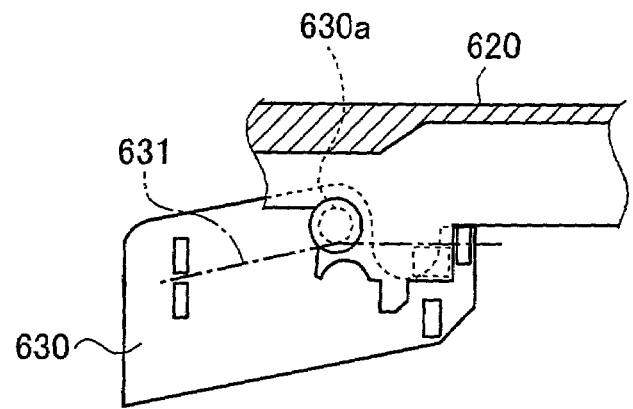
FIGS. 33A and 33B, respectively, are partially cross-sectional, enlarged side view showing a mounted state of a lid using a conventional metal-made lid spring.
Figure 33B:
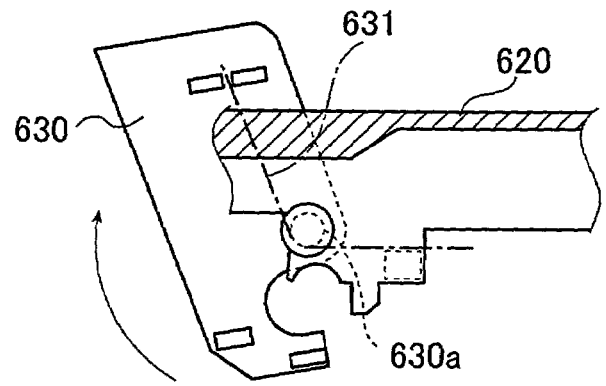

Before describing this aspect, we first describe the mounted state of the lid in the conventional magnetic tape cassette. The above-mentioned FIGS. 33A and 33B are partially cross-sectional, enlarged side views showing the mounted state of the lid employing the conventional lid spring made of metal, where FIG. 33A shows the closing state of the lid and FIG. 33B shows the open state of the lid. Also, in FIGS. 33A and 33B, a numeral 620 refers to the upper half, a numeral 630 to the outer lid, a numeral 620b to the engagement portion of the rotary shaft 630a of the outer lid 630 upwardly provided on the upper half 620, and a numeral 631 to the lid spring made of metal.

In the structure shown in FIGS. 33A and 33B, when assembling, the upper lid 632 and the inner lid 634 are assembled to the outer lid 630, to whose rotary shaft 630a the metal-made lid spring 631 is assembled to, and this whole assembled component is next fitted from the outside (front side) into the rotary shaft engagement portion 620b provided upwardly on the upper half 620. Finally, one end of the lid spring 631 is nipped in the anchor portion. Such procedure requires significant labor as above mentioned, due to so many parts to be handled at a time.

In the following embodiment of this aspect, an example in which the above-described lid spring 631 of the DVC is made of resin will be described.

Figure 32:
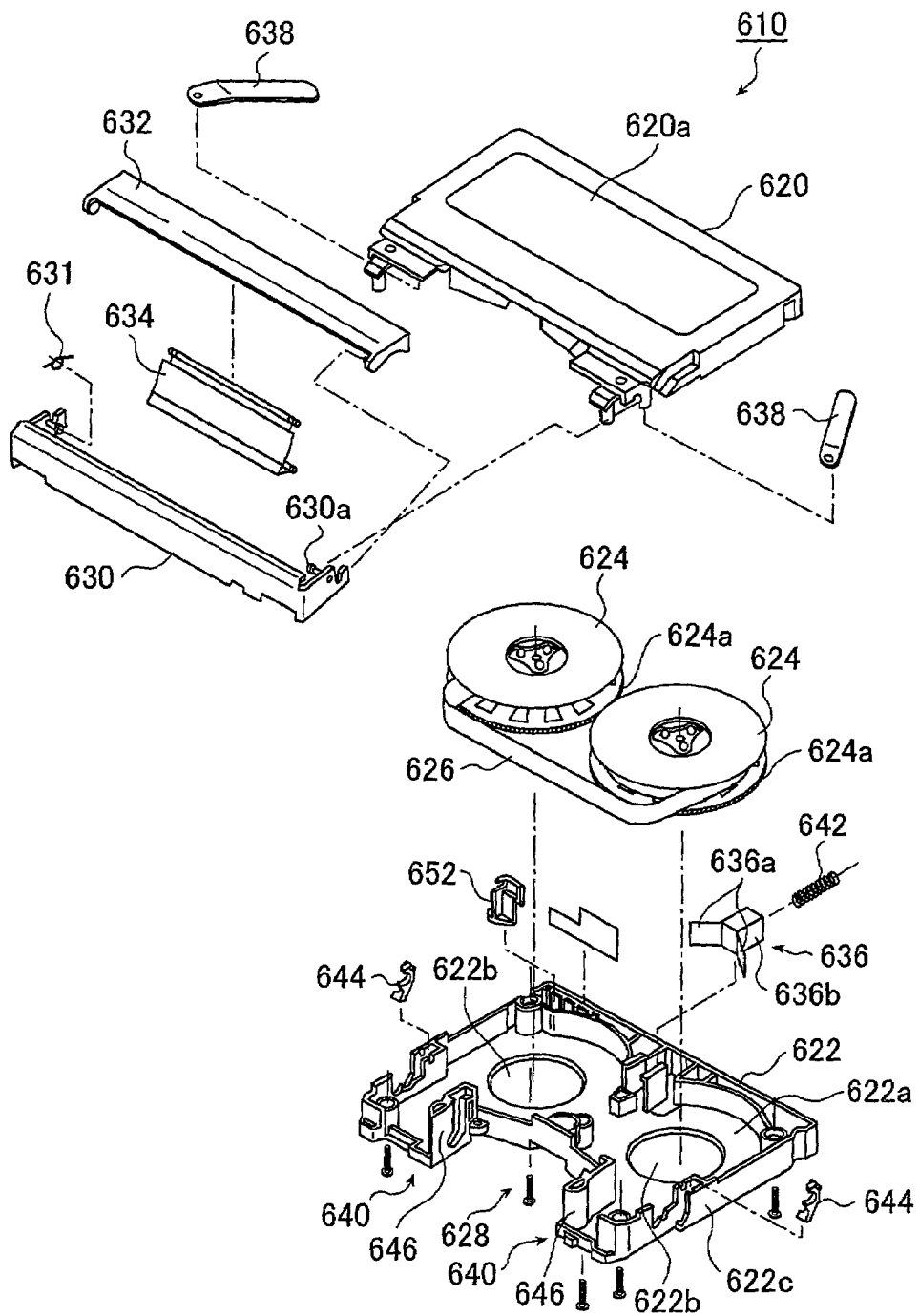
FIG. 32 is an exploded perspective view showing a structure of a DVC that is one example of a magnetic tape cassette.

FIGS. 15A and 15B are partially cross-sectional, enlarged side views showing a mounted state as well as an outline of the operating state of a lid and a lid spring that is a lid urging member of an example of magnetic tape cassette according to the first embodiment of the third aspect of this invention. In the cassette according to this example, a lid spring 533 made of resin (made of POM resin here) is used instead of the lid spring 631 made of metal shown in FIGS. 32, 33A and 33B.

Figure 16:
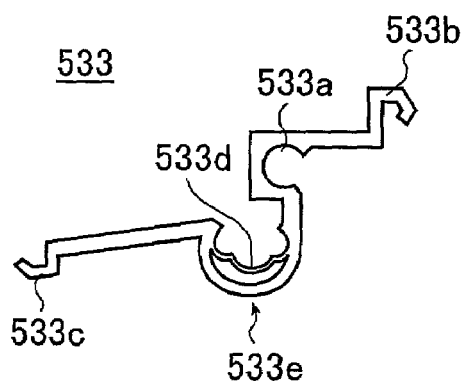
FIG. 16 is a side view showing a detailed shape of the lid spring made of resin shown in FIGS. 15A and 15B.

FIG. 16 shows a detailed shape of the above-described lid spring 533 made of resin. In FIG. 16, reference numeral 533*a* denotes an engagement portion to a rotary shaft 630*a* of an outer lid 630, numeral 533*b* denotes an anchor portion to an upper half 620, numeral 533*c* denotes an anchor portion to the outer lid 630 and numeral 533*d* denotes a shape stabilizing reinforcement member. Note that, numeral 533*e* denotes a bent portion that is subjected to a maximum deformation of the lid spring 533.

The above-described shape stabilizing reinforcement member 533*d* is formed in parallel with the bent portion 533*e* that is subjected to the maximum deformation of the lid spring 533. In a case where the bent portion 533*e* is subjected to the maximum deformation; that is, in a case where the lid is opened, this reinforcement member 533*d* is deformed as shown in FIGS. 17A and 17B to prevent generation of unfavorable deformation such as twist without preventing any deformation of the bent portion 533*e* in a predetermined direction.

According to this example, the lid spring 533 is changed from the conventional torsion spring made of metal to one made of resin, whereby not only can the mounting (assembling) of the lid spring 533 be facilitated but also it is possible to assemble or disassemble the cassette with such efficiency that is equal to or more than that for the case where the torsion spring made of metal is used, and also, at the same time, change of the material and shape of the lid spring 533 does not impose adverse affect on the basic performance of the magnetic tape cassette.

That is, in the structure using the lid spring 533 made of resin in accordance with this example, since, in a stage of assembling this, it is possible to set the lid spring 533 after the lid spring 533 was assembled in the lid, it becomes possible to considerably simplify the assembling steps and mass production of the parts thereof becomes possible, to thereby realize the reduction of cost and, further, to obtain a large economical effect of considerably reducing labor for disassembling the lid spring.

Figure 18:
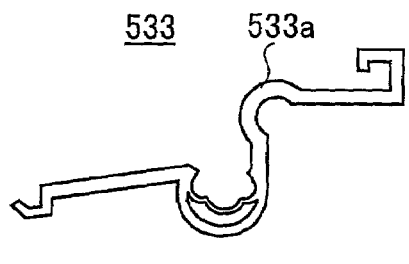
FIG. 18 is a partially cross-sectional, enlarged side view showing a mounted state of a lid and a lid spring in another example of a magnetic tape cassette according to the present invention.

FIG. 18 is a partially cross-sectional, enlarged side view showing a mounted state of a lid and a lid spring of a magnetic tape cassette according to still another example of the present invention, which corresponds to FIGS. 33A and 33B above. Also in here, only essential points will be described.

The lid spring 533 according to the embodiment shown in FIG. 18 is substantially the same as that of the example shown in FIGS. 15A and 15B, and is different only in a shape of the engagement portion 533*a* from the above-described lid spring 533. Thus, the lid spring in this embodiment has exactly the same function. That is, both are slightly different from each other in a wound position of the outer lid 630 to the rotary shaft 630*a*. However, this is in the range of a design choice in the structure of the spring lid.

Also, with the lid spring 533 according to this example, since, in a stage of assembling this, it is possible to set the lid spring 533 after the lid spring 533 was assembled in the lid, it becomes possible to considerably simplify the assembling steps, as well as to realize reduction of cost and, further, to obtain a large economical effect of considerably reducing labor for disassembling the lid spring.

Figure 19:
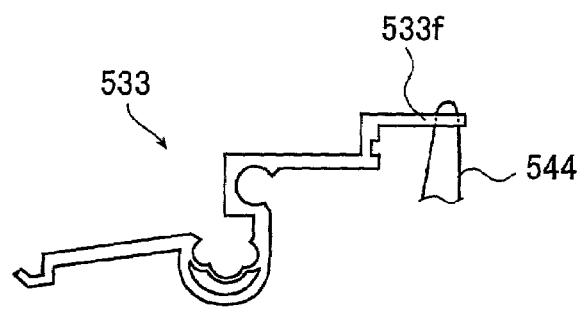
FIG. 19 is a partially cross-sectional, enlarged side view showing a mounted state of a lid and a lid spring in another example of a magnetic tape cassette according to the present invention.

FIG. 19 is a partially cross-sectional, enlarged side view showing a mounted state of a lid and a lid spring in still another example of the magnetic tape cassette according to this aspect. In the magnetic tape cassette according to this example, the rear side of the lid spring 533 (on the side anchored to the upper half) is extended to impart a function of a lid lock spring for urging the lid lock member 544 to this extended portion 533*f*. Also in here, only essential points will be described.

The function of the lid spring according to this example is to realize, with the resin-made spring, the function that has been realized in the conventional metal-made lid spring. The material having creep-resistant property is used to thereby make it possible to impart such a function. The method of anchoring or the like is the same as that of the lid spring according to the example shown in FIGS. 15A and 15B and FIG. 18.

Also according to this example, in the same manner as the lid springs according to the example shown in FIGS. 15A and 15B and FIG. 18, since, in a stage of assembling this, it is possible to set the lid spring 533 after the lid spring 533 was assembled in the lid, it becomes possible to considerably simplify the assembling steps, as well as to realize reduction of cost and, further, to obtain a large economical effect of considerably reducing labor for disassembling the lid spring.

Incidentally, in the magnetic tape cassette according to the above-described example, in order to enhance shape stability of the above-described lid spring in the surface that is perpendicular to the shaft of the lid, it is preferable to provide a reinforcement member that may also serve to prevent twist at a suitable position as described above. Note that, it is preferable to provide this reinforcement member in parallel to the bent portion that is subjected to the maximum deformation.

Still another embodiment of the third aspect of the present invention will now be described. Also in the following embodiment, an aspect in which the present invention is applied to a DVC will be shown.

The magnetic tape cassette according to this embodiment is characterized in that, in order to enhance bending property of the above-described lid spring, a predetermined number of bending assist (promotion) portions are provided in suitable positions. Note that, it is possible to preferably use, as a shape of this bending assist portion, a small-diameter recess portion or a throttle portion (any one of these may be provided on both side surfaces of or in any one of upper and lower surfaces of the lid spring) or a small-diameter bending portion (having a convex portion on one side and a concave portion on the other side).

Figure 20A:
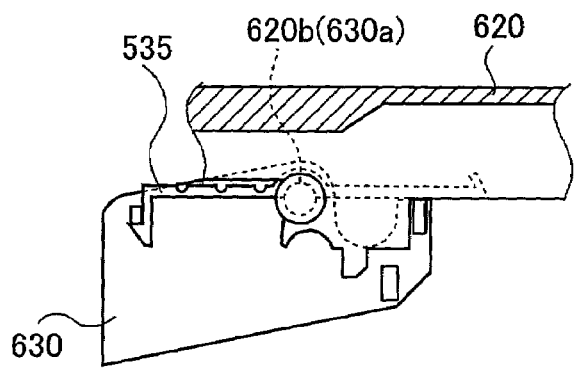
FIGS. 20A and 20B are partially cross-sectional, enlarged side views showing a mounted state of a lid and a lid spring in an example of a magnetic tape cassette according to another embodiment of another aspect of the present invention.
Figure 20B:
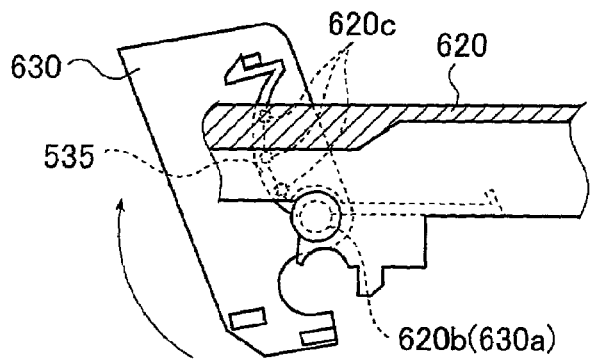

FIGS. 20A and 20B are partially cross-sectional, enlarged side views showing a mounted state and an operating state of a lid and a lid spring of an example of a magnetic tape cassette according to the first embodiment of the third aspect of the invention, which correspond to FIGS. 33A and 33B. In the magnetic tape cassette according to this example, a lid spring 535 made of resin (made of POM resin in this case) is used instead of the metal-made lid spring 631.

Note that, FIG. 20A corresponds to a closing state of the lid of the magnetic tape cassette and FIG. 20B corresponds to an open state of the lid. Also, reference symbol 620*c* in FIG. 20B denotes a bending assist portion of the lid spring 535, provided in the vicinity of the engagement portion 620*b* of the rotary shaft 630*a* of the above-described outer lid 630 on the side wall of the upper half 620.

Figure 21:
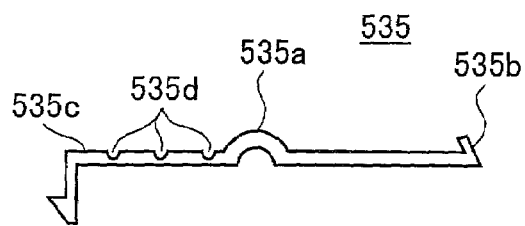
FIG. 21 is a side view showing a detailed shape of the lid spring made of resin shown in FIGS. 20A and 20B.
Figure 22:
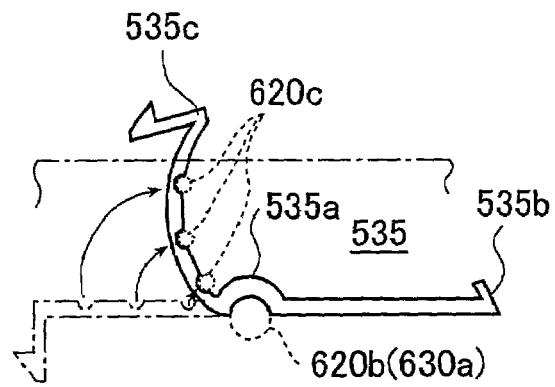
FIG. 22 is a side view showing a deformed state of the lid spring shown in FIG. 21.

A detailed shape of the above-described lid spring 535 made of resin is shown in FIG. 21, in which reference symbol 535*a* denotes an engagement portion of the rotary shaft 630*a* to the outer lid 630, symbol 535*b* denotes an anchor portion to the upper half 620, symbol 535*c* denotes an anchor portion to the outer lid 630 and symbol 535*d* denotes bending promotion portions provided in predetermined positions of the lid spring 535.

The above-described bending promotion portions 535d are provided at a plurality of positions in the vicinity of a portion where deformation of the lid spring 535 is at maximum. In a case where the bending promotion portions 535d are subjected to the maximum deformation, i.e., when the lid is opened, these bending promotion portions 535d are deformed in a larger degree as the bending promotion portions 535d come closer to the end portion 535c thereof (the anchor portion to the outer lid 630) along the above-described plurality of bending assist portions 620c as shown by arrows in FIG. 22. With this, it becomes possible to realize the smooth bending of the lid spring 535.

According to this example, the lid spring 535 is changed from the conventional metal-made torsion spring to one made of resin, whereby it becomes possible to obtain effects that not only may the lid spring 535 be mounted (assembled) with ease but also it is possible to assemble or disassemble the lid spring with such efficiency that is equal to or more than that of the case where the conventional metal-made torsion spring is used.

That is, in a structure using the lid spring 533 made of resin in accordance with this example, since, in a stage of assembling this, it is possible to set the lid spring 535 after the lid spring 535 was assembled in the lid, it becomes possible to considerably simplify the assembling steps, as well as to realize the reduction of cost and, further, to obtain a large economical effect of considerably reducing labor for disassembling the lid.

Figure 23A:
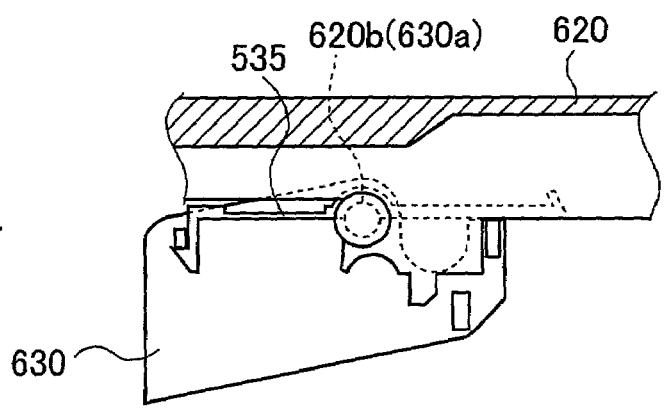
FIGS. 23A and 23B, respectively, are partially cross-sectional, enlarged side views showing a mounted state of a lid and a lid spring in another example of a magnetic tape cassette according to the present invention.
Figure 23B:
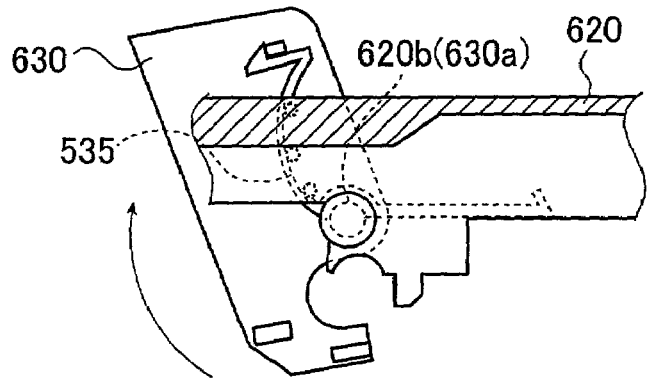

FIGS. 23A and 23B are partially cross-sectional, enlarged side views showing a mounted state of a lid and a lid spring of a magnetic tape cassette according to still another example of the present invention, which correspond to FIGS. 33A and 33B above. Also in here, only essential points will be described.

The example shown in FIGS. 23A and 23B has substantially the same structure as that of the example shown in FIG. 21. However, in the lid spring 535 according to this embodiment, kinds and dimensions (thickness) of a used material are selected suitably to thereby make it possible to omit the bending promotion portions 535d. With this, it is possible to obtain such an effect that the shape of the above-described lid anchor portion of the upper half 620 is not changed from the conventional shape.

Also, with the lid spring 535 according to this example, since, in a stage of assembling this, it is possible to set the lid spring 535 after the lid spring 535 was assembled in the lid, it becomes possible to considerably simplify the assembling steps, as well as to realize reduction of cost and, further, to obtain a large economical effect of considerably reducing labor for disassembling the lid.

FIGS. 24A and 24B are side views showing a lid spring according to still another aspect of the present invention. The lid spring according to this example is an example in which the shapes of the above-described bending promotion portions 535d of the lid spring 535 are changed. FIG. 24A shows a spring having the bending promotion portions having semi-circular recess portions on a top surface side and FIG. 24B shows a spring having the bending promotion portions having on a top surface and a bottom surface pairs of convex shapes on one surface side and concave shapes on the other surface side. However, the present invention is not limited to this arrangement.

FIG. 25 is a partially cross-sectional, enlarged side view showing a mounted state of a lid and a lid spring of still another example of a magnetic tape cassette according to.

the present aspect. In the magnetic tape cassette according to this example, a rear side (on the side anchored to the upper half) of the lid spring is extended to impart a function of the lid lock spring for urging the lid lock member 544 to this extended portion. Note that, only essential points will be described.

The function of the lid spring according to this embodiment is to realize, with the resin-made spring, the function that has been realized in the conventional metal-made lid spring, and a material having creep-resistant property is used to make it possible to impart thereto such a function. The method of anchoring is the same as that of the lid spring according to the examples shown in FIGS. 20A and 20B, FIGS. 23A and 23B and FIGS. 24A and 24B.

Also according to this example, with the lid spring according to the above-mentioned respective examples, since, in a stage of assembling this, it is possible to set the lid spring 535 after the lid spring 535 was assembled in the lid, it becomes possible to considerably simplify the assembling steps, as well as to realize reduction of cost and to obtain a large economical effect of considerably reducing the labor for disassembling the lid spring.

In the above description, the lid urging member (lid spring) of recording media cartridges such as the magnetic tape cassette according to the present invention has been particularly described in detail. However, each embodiment described above shows an example of the present invention and the present invention is not limited thereto. It goes without saying that it is possible to appropriately make changes or modifications within the scope not departing from the gist of the present invention.

The present invention, for instance, is not limited to the above-mentioned magnetic tape cassette and may be applied to any type of recording media cartridge including a one-reel type magnetic tape cassette or magnetic tape cartridge, a magnetic disc cartridge, and a magneto-optical disc cartridge, as long as it has a lid to protect the recording media accommodated in a case body formed by coupling an upper half and a lower half and a lid urging member (lid spring) for urging the lid in a closing direction, wherein the lid is mounted to a front edge of the upper half by rotary shafts provided at both side ends thereof in a manner capable of opening/closing, and the lid is urged by the lid spring in the rotating direction for closing during the open state.

As described above in detail, according to the first aspect of the present invention, it is possible to achieve a remarkable effect of providing a recording media cartridge that is effective in improving the assembling property of the recording media cartridge, e.g. a magnetic tape cassette due to its easy assembling of a lid urging member into a case body; that can form the lid urging member thereof with a resin material without employing a spring member made of metal, wherein the sorting and collection of resin materials is easier; and therefore that is effective for reduction in environmental impacts.

Also as described above in detail, according to the second aspect of the present invention, it is possible to achieve a remarkable effect of providing recording media cartridge that can reduce the number of steps during assembling as well as the sorting labor upon disassembling and wasting thereof while that can promote the reduction in environmental impact by changing a conventional lid spring made of metal to a lid spring made of resin (plastic).

More specifically, according to the second aspect of the invention, it is possible to obtain such an effect of providing a recording media cartridge, e.g. a magnetic tape cassette that can reduce the assembling and disassembling labor as well as the sorting labor upon disassembling by employing the simple parts, and that can give significant advantages to a manufacture.

As described above in detail, according to the third aspect of the present invention, it is possible to obtain such a remarkable effect of providing a recording media cartridge such as a magnetic tape cassette that can enhance the assembling property of the lid urging member (lid spring), which is made of resin and rotatably provided on the upper case, for urging in a direction for closing the lid provided for protecting the recording media, and that can reduce the labor upon sorting and collecting thereof, and at the same time, that can reduce the environmental impacts.

More specifically, as described above, also in the case where the lid spring is made of resin and the anchoring method thereof is changed, it is possible to realize a recording media cartridge that can simplify the assembling steps and makes it possible to sort and collect the resin material without adversely affecting the basic performance of the recording media cartridge due to the change in the material and the shape of the lid spring.

What is claimed is:

1. A recording media cartridge, comprising:
    a case body formed by coupling an upper half and a lower half;
    a lid for opening and closing a front surface side opening portion of said case body and mounted on said upper half openably and closeably by rotary shafts provided on both side ends of said lid; and
    a lid urging member having an inflection arm portion between a support end portion engaging with the upper half and an anchor end portion anchored at a front edge inner surface of said lid, wherein
    said inflection arm portion of the lid urging member is brought into contact with at least one portion of said upper half when said lid is opened; and said inflection arm portion is inflected by making said at least one portion as a point of inflection, whereby said lid is urged in a rotating direction for closing.

2. The recording media cartridge according to claim 1, wherein said lid urging member is a lid spring made of resin, and said lid spring is made of rigid resin having creep-resistant property.

3. The recording media cartridge according to claim 2, wherein the lid urging member is not a torsion coil spring.

4. The recording media cartridge according to claim 1, wherein said lid urging member is a lid spring made of resin, and said lid spring is made of at least one selected from the group consisting of POM resin, PBT resin and PAR resin.

5. The recording media cartridge according to claim 4, wherein the lid urging member is not a torsion coil spring.

6. The recording media cartridge according to claim 1, wherein the lid urging member is not a torsion coil spring.

* * * * *